(12) United States Patent
Murison

(10) Patent No.: US 11,466,792 B2
(45) Date of Patent: Oct. 11, 2022

(54) ELECTROMAGNETICALLY ACTUATED FLUIDIC VALVES AND SWITCHES

(71) Applicant: OBOTICS INC., Ontario (CA)

(72) Inventor: Bruce Murison, Ontario (CA)

(73) Assignee: Obotics Inc., Ontario (CA)

( * ) Notice: Subject to any disclaimer, the term of this patent is extended or adjusted under 35 U.S.C. 154(b) by 0 days.

(21) Appl. No.: 17/058,427

(22) PCT Filed: May 27, 2019

(86) PCT No.: PCT/CA2019/000077
§ 371 (c)(1),
(2) Date: Nov. 24, 2020

(87) PCT Pub. No.: WO2019/222832
PCT Pub. Date: Nov. 28, 2019

(65) Prior Publication Data
US 2021/0207733 A1 Jul. 8, 2021

Related U.S. Application Data

(60) Provisional application No. 62/676,412, filed on May 25, 2018.

(51) Int. Cl.
*F16K 31/08* (2006.01)
*F16K 31/06* (2006.01)
*A61H 23/04* (2006.01)

(52) U.S. Cl.
CPC ........ *F16K 31/082* (2013.01); *F16K 31/0627* (2013.01); *F16K 31/0679* (2013.01); *A61H 23/04* (2013.01)

(58) Field of Classification Search
CPC . F16K 31/0627; F16K 31/0679; F16K 31/082
See application file for complete search history.

(56) References Cited

U.S. PATENT DOCUMENTS 2,686,280 A    8/1954  Strong et al.
4,253,493 A *  3/1981  English ............... F01L 9/20
                                                     137/625.18

(Continued)

FOREIGN PATENT DOCUMENTS

WO    WO2018007074    1/2018

OTHER PUBLICATIONS

International Search Report for International Application No. PCT/CA2019/000077, dated Sep. 4, 2019, 2 pages.

*Primary Examiner* — Eric Keasel
(74) *Attorney, Agent, or Firm* — Stetina Brunda Garred and Brucker

(57) ABSTRACT

The absence of high efficiency, compact fluidic pumps has until recently blocked the consideration of using hydraulic devices within portable and/or alkaline battery powered consumer and non-consumer products. The higher the functionality and programmability desired for a consumer and/or non-consumer product exploiting a fluidic pump then the more complex the overall fluidic system in terms of the number of actuators, valves, switches etc. within the fluidic system coupled to the one or more fluidic pumps. Accordingly, there exists a requirement to provide compact fluidic valves and switches to support configurability, programmability, and operation of these portable battery-operated consumer and non-consumer devices in conjunction with these newly available high efficiency, compact fluidic pumps. Such fluidic valves and switches should offer high efficiency, have a small footprint, be low complexity for high reliability and ease of manufacture, and low cost.

11 Claims, 24 Drawing Sheets

(56) References Cited

U.S. PATENT DOCUMENTS

| | | |
|---|---|---|
| 4,655,249 A | 4/1987 | Livet |
| 2011/0260085 A1 | 10/2011 | Van Der Zee et al. |
| 2014/0088468 A1 | 3/2014 | Murison |

* cited by examiner

Figure 4
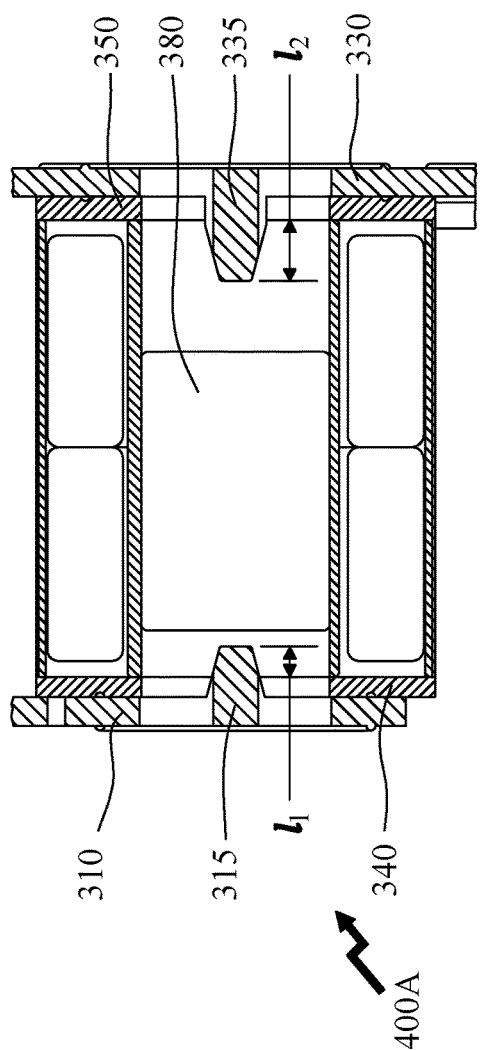
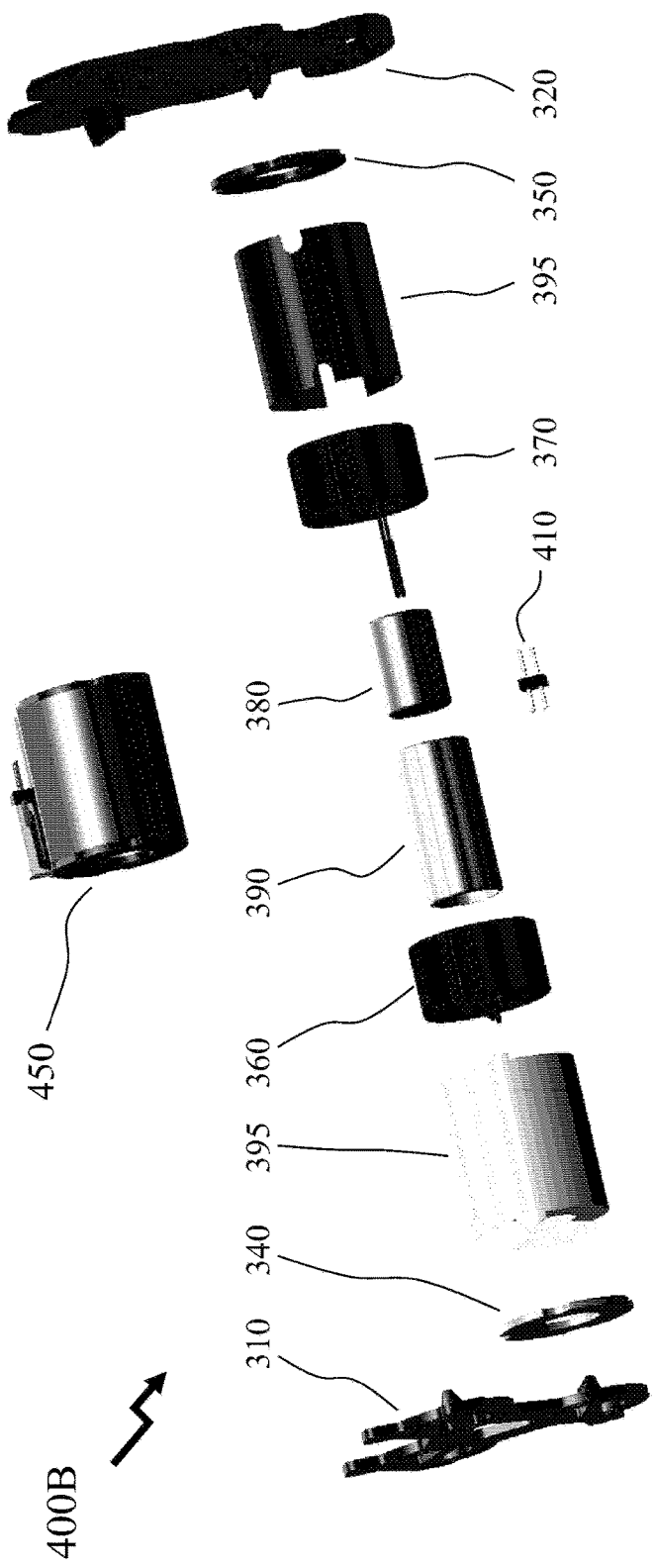

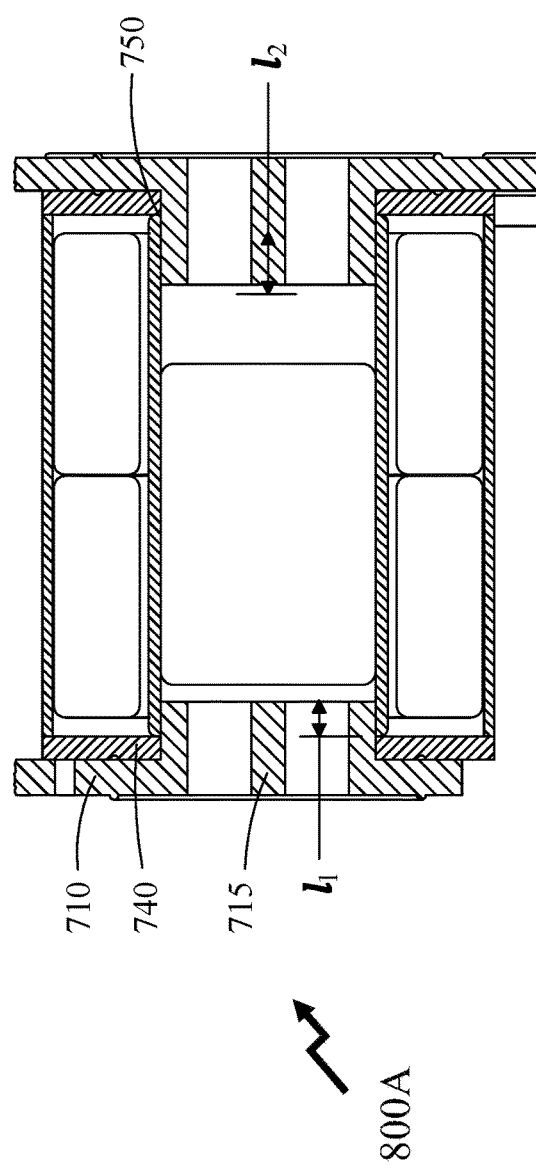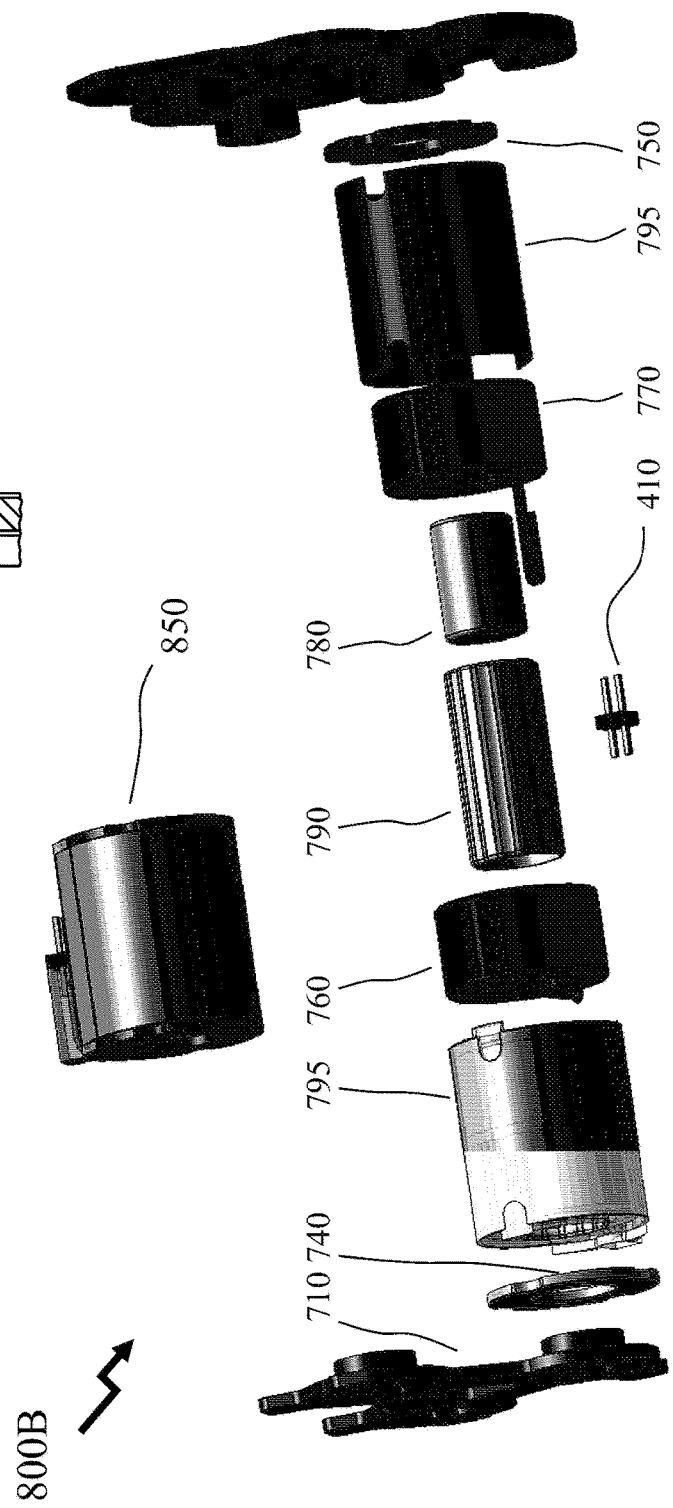
Figure 8

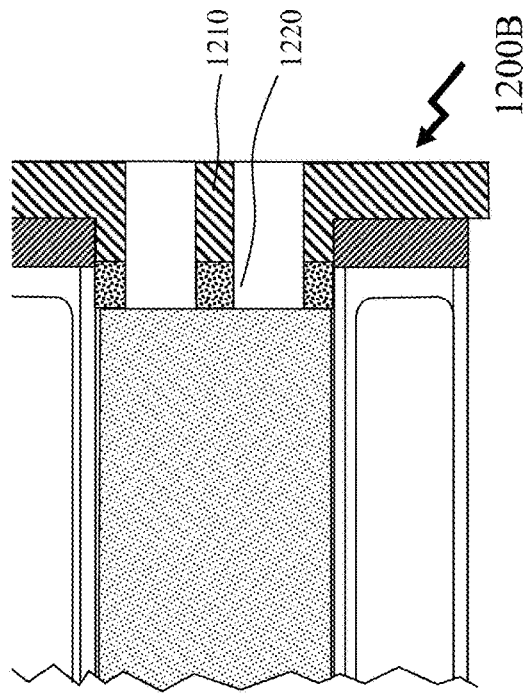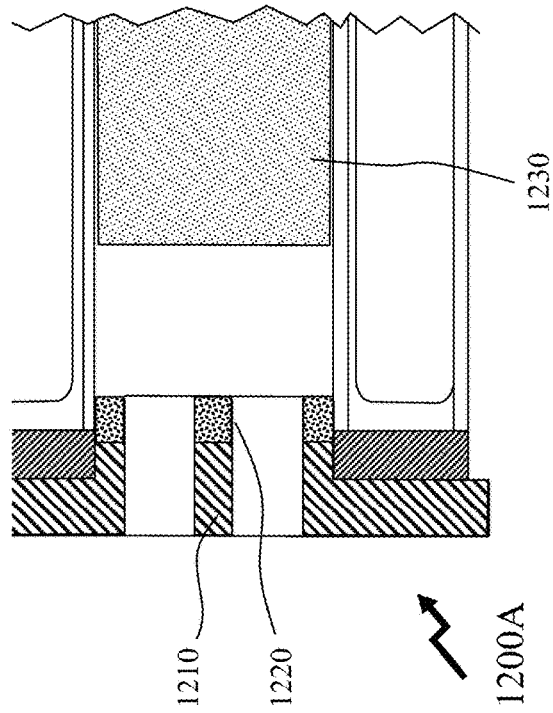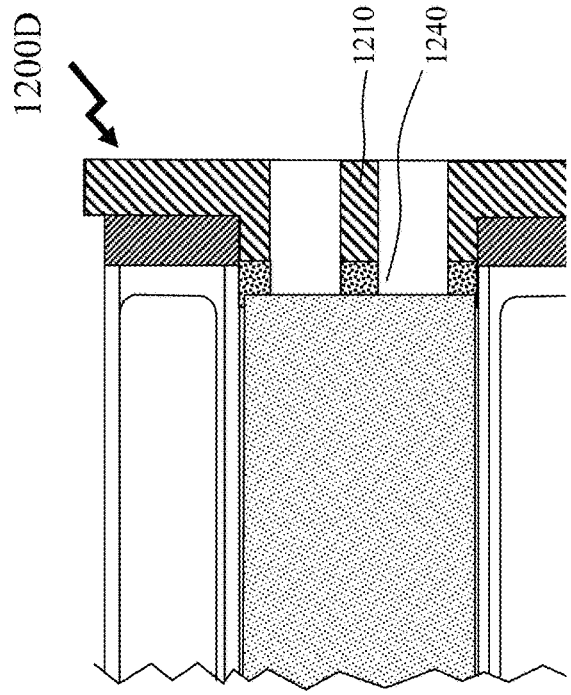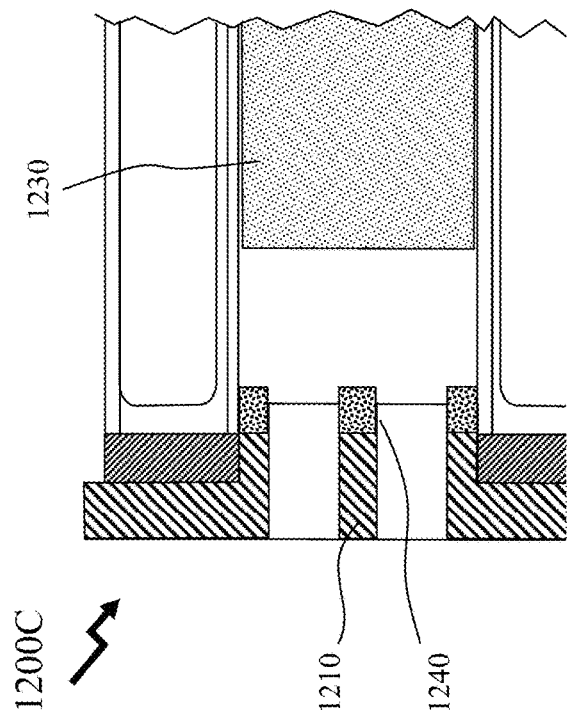
Figure 12A

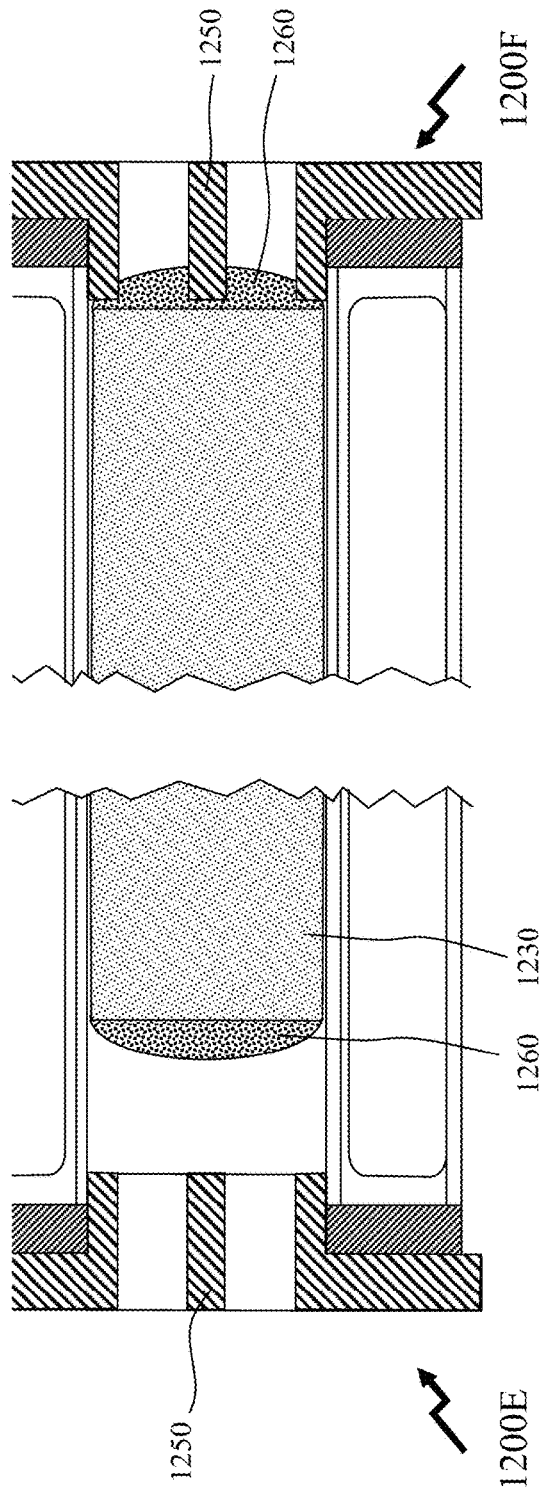
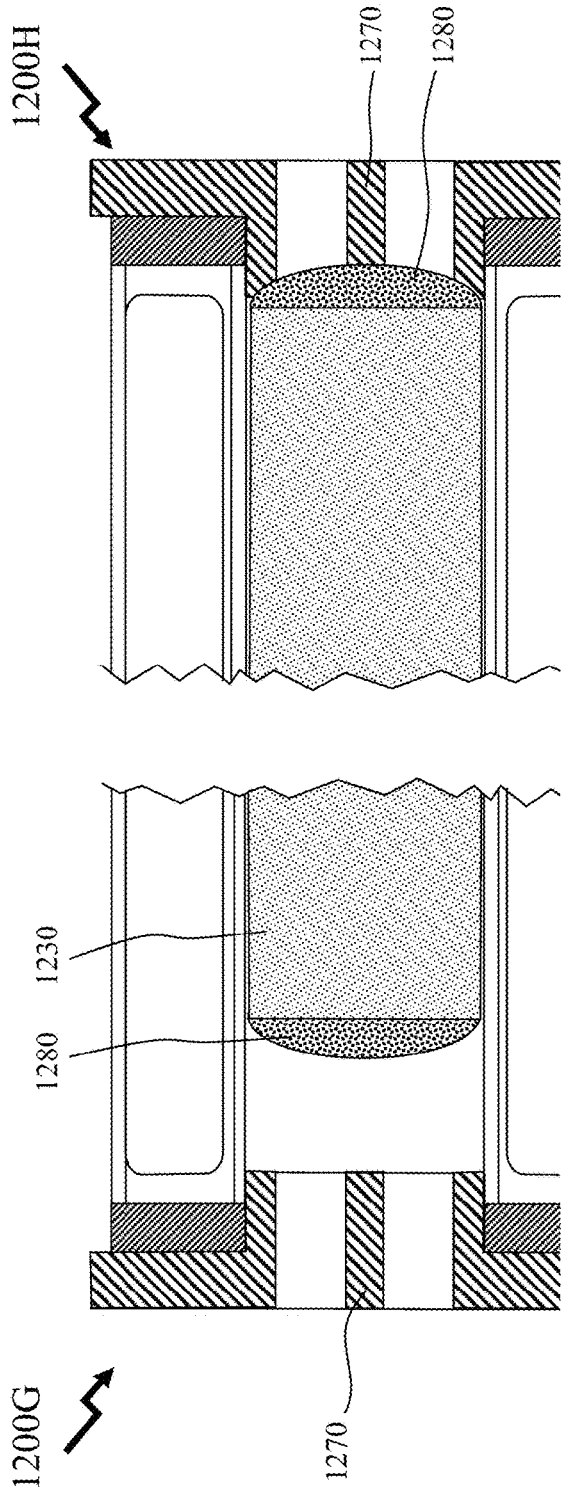
Figure 12B

ELECTROMAGNETICALLY ACTUATED FLUIDIC VALVES AND SWITCHES

CROSS-REFERENCE TO RELATED APPLICATIONS

The present application claims priority to PCT International Application No. PCT/CA2019/000077, filed May 27, 2019, which claims the benefit of U.S. Provisional Application No. 62/676,412, filed May 25, 2018, the entire disclosures of which are expressly incorporated herein by reference.

STATEMENT RE: FEDERALLY SPONSORED RESEARCH/DEVELOPMENT

Not Applicable.

FIELD OF THE INVENTION

The present invention relates to fluidic valves and switches and more particularly to fluidic valves and switches for consumer and non-consumer applications offering high efficiency, small footprint, low complexity and low cost.

BACKGROUND OF THE INVENTION

Within a wide range of consumer and non-consumer products there are requirements for a range of different actuators which are controlled from one or more motors either directly or via switches etc. Within many instances their applications are limited by the availability of compact, low cost motors to provide distributed power for motion generation and/or pressure generation. In comparison to other techniques fluidics offers an efficient means of distributing power to activate elements remote from the power source as the pressure/fluid flow may be used directly to generate pressure and/or motion without requiring an additional transducer, e.g. a motor to convert electric power to mechanical power. Accordingly, fluidics may allow either air and/or liquid based fluidic devices to be provided which are suitable for applications in these consumer and non-consumer products that are compatible with the dimensions, design, and performance required whilst also operating multiple actuators of one or more types and allowing multiple motors (pumps) to be employed within a small region. Further, fluidic actuators may be flexed and/or distorted during operation as well as operating after having been flexed and/or distorted.

Today fluidic developments are primarily within the realm of micro-fluidics for self-powered biological and/or chemical testing applications where dimensions are measured in micrometers (microinches) or pump based hydraulic (fluidic) systems for plumbing, refrigeration, heating, hydroculture, vehicle suspensions, etc. where dimensions are measured in centimeters (inches). Such pump based systems exploit pumps such as rotary vane pumps, diaphragm pumps, gear pumps etc. which are bulky, low efficiency, and high power requiring connection to the electrical power grid (mains electricity) or other power sources such as lead acid batteries or petrol/diesel/gas engines. The absence of high efficiency, compact fluidic pumps has until recently blocked the consideration of using hydraulic devices within portable and/or alkaline battery powered consumer and non-consumer products. Further, most prior art pumps do not support the operation modes required for such devices, such as, for example, low frequency, variable duration, and pulsed for those providing primary pumps for dimensional adjustments or for example, high frequency operation for those providing secondary pumps for vibration and other types of motion/excitation.

In contrast, electromagnetic pumps offer a low power, compact, linear fluidic pump solution as evident from those developed by the inventor and described within WO/2014/047717 entitled "Methods and Devices for Fluidic Driven Adult Devices" and WO/2014/047718 entitled "Fluidic Methods and Devices." Such electromagnetic pumps can achieve sufficient efficiency to enable their deployment within portable battery powered consumer and non-consumer products employing fluidics such as those, for example, described by the inventor within the preceding publications and WO/2015/135,070 entitled "Methods and Devices to Hydraulic Consumer Devices." The entire contents of WO/2014/047,717; WO/2914/047,718; and WO/2015/135,070 being incorporated herein by reference.

However, the higher the functionality and programmability desired for the consumer and/or non-consumer product then the more complex the overall fluidic system in terms of the number of actuators, valves, switches etc. within the fluidic system coupled to the one or more fluidic pumps. It would therefore be beneficial to be provide fluidic valves and switches to support configurability, programmability, and operation of these portable battery-operated consumer and non-consumer devices. Accordingly, such fluidic valves and switches should offer high efficiency, have a small footprint, be low complexity for high reliability and ease of manufacture, and low cost.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to fluidic valves and switches and more particularly to fluidic valves and switches for consumer and non-consumer applications offering high efficiency, small footprint, low complexity and low cost.

In accordance with an embodiment of the invention there is provided a fluidic device comprising:
a piston comprising at least a core formed from a first magnetic material having a first length and a first predetermined lateral dimension;
a piston sleeve formed from a first predetermined non-magnetic material having an inner bore having a predetermined tolerance with respect to the first predetermined lateral dimension of the piston, an outer profile of a second predetermined lateral dimension, and a second length;
at least an electrical coil of a plurality of electrical coils, each electrical coil with an inner bore having a predetermined tolerance with respect to the second predetermined lateral dimension, a fourth length, and disposed at a predetermined position relative to the piston sleeve in dependence upon at least the lengths of the piston sleeve and piston;
a pair of magnetic washers formed from a second predetermined magnetic material each having a second thickness and having a central opening, wherein each magnetic washer is disposed at one end of the piston sleeve; and
a pair of non-magnetic washers formed from at least a third predetermined non-magnetic material having an outer portion, an inner portion, and comprising a pair of openings through at least the outer portion of the non-magnetic washer, wherein the pair of openings are disposed either side of a radial axis of the non-magnetic washer and each non-magnetic washer is disposed externally to one of the magnetic washers such that a surface of the outer portion is in contact with the magnetic washer and the inner portion projects through the magnetic washer towards the middle of the piston sleeve and limits motion of the piston within the piston sleeve;

wherein in a first configuration the piston is retained against the inner portion of the non-magnetic washer at one end of the piston sleeve by magnetic attraction to the magnetic washer at that end of the piston sleeve thereby blocking fluid flow through the pair of openings at that end of the piston sleeve but allowing fluid flow through the pair of openings at the other distal end of the piston sleeve;

in a second configuration the piston is retained against the inner portion of the non-magnetic washer at the other distal end of the piston sleeve by magnetic attraction to the magnetic washer at that distal end of the piston sleeve thereby blocking fluid flow through the pair of openings at that distal end of the piston sleeve but allowing fluid flow through the pair of openings via at the other end of the piston sleeve; and the piston is moved to establish either of the first configuration and the second configuration by selective electrical excitation of the at least one electrical coil of the plurality of electrical coils.

In accordance with an embodiment of the invention there is provided a fluidic device comprising:

a piston having a first length and a first predetermined lateral dimension comprising a core formed from a first magnetic material and a pair of end caps formed from a first predetermined non-magnetic material;

a piston sleeve formed from a first predetermined non-magnetic material having an inner bore having a predetermined tolerance with respect to the first predetermined lateral dimension of the piston, an outer profile of a second predetermined lateral dimension, and a second length;

at least an electrical coil of a plurality of electrical coils, each electrical coil with an inner bore having a predetermined tolerance with respect to the second predetermined lateral dimension, a fourth length, and disposed at a predetermined position relative to the piston sleeve in dependence upon at least the lengths of the piston sleeve and piston;

a pair of magnetic washers formed from a second predetermined magnetic material each having a second thickness and having a central opening, wherein each magnetic washer is disposed at one end of the piston sleeve; and a pair of non-magnetic washers formed from at least a second predetermined non-magnetic material having an outer portion, an inner portion, and comprising a pair of openings through at least the outer portion of the non-magnetic washer, wherein the pair of openings are disposed either side of a radial axis of the non-magnetic washer and each non-magnetic washer is disposed externally to one of the magnetic washers such that a surface of the outer portion is in contact with the magnetic washer and the inner portion projects through the magnetic washer towards the middle of the piston sleeve and limits motion of the piston within the piston sleeve;

wherein in a first configuration the piston is retained against the inner portion of the non-magnetic washer at one end of the piston sleeve by magnetic attraction to the magnetic washer at that end of the piston sleeve thereby blocking fluid flow through the pair of openings at that end of the piston sleeve but allowing fluid flow through the pair of openings at the other distal end of the piston sleeve;

in a second configuration the piston is retained against the inner portion of the non-magnetic washer at the other distal end of the piston sleeve by magnetic attraction to the magnetic washer at that distal end of the piston sleeve thereby blocking fluid flow through the pair of openings at that distal end of the piston sleeve but allowing fluid flow through the pair of openings via at the other end of the piston sleeve; and the piston is moved to establish either of the first configuration and the second configuration by selective electrical excitation of the at least one electrical coil of the plurality of electrical coils.

In accordance with an embodiment of the invention there is provided a fluidic device comprising:

a piston comprising at least a core formed from a first magnetic material having a first length and a first predetermined lateral dimension;

a piston sleeve formed from a first predetermined non-magnetic material having an inner bore having a predetermined tolerance with respect to the first predetermined lateral dimension of the piston, an outer profile of a second predetermined lateral dimension, and a second length;

at least an electrical coil of a plurality of electrical coils, each electrical coil with an inner bore having a predetermined tolerance with respect to the second predetermined lateral dimension, a fourth length, and disposed at a predetermined position relative to the piston sleeve in dependence upon at least the lengths of the piston sleeve and piston;

a pair of magnetic washers formed from a second predetermined magnetic material each having a second thickness and having a central opening, wherein each magnetic washer is disposed at one end of the piston sleeve;

a first body disposed at one end of the piston sleeve formed from at least a third predetermined non-magnetic material having an outer portion, an inner portion, and defining a pair of openings through at least the outer portion of the non-magnetic washer, wherein the pair of openings are disposed either side of a radial axis of the piston sleeve, the outer portion has a first surface disposed towards the external surface of the magnetic washer at that end of the piston sleeve, and the inner portion projects through the magnetic washer towards the middle of the piston sleeve and limits motion of the piston within the piston sleeve; and a second body disposed at the other end of the piston sleeve formed from at least a fourth predetermined non-magnetic material having an outer portion, an inner portion, and defining a pair of openings through at least the outer portion of the non-magnetic washer, wherein the pair of openings are disposed either side of a radial axis of the piston sleeve, the outer portion has a first surface disposed towards the external surface of the magnetic washer at that end of the piston sleeve, and the inner portion projects through the magnetic washer towards the middle of the piston sleeve and limits motion of the piston within the piston sleeve;

wherein in a first configuration the piston is retained against the inner portion of the non-magnetic washer at one end of the piston sleeve by magnetic attraction to the magnetic washer at that end of the piston sleeve thereby blocking fluid flow through the pair of openings at that end of the piston sleeve but allowing fluid flow through the pair of openings at the other distal end of the piston sleeve;

in a second configuration the piston is retained against the inner portion of the non-magnetic washer at the other distal end of the piston sleeve by magnetic attraction to the magnetic washer at that distal end of the piston sleeve thereby blocking fluid flow through the pair of openings at that distal end of the piston sleeve but allowing fluid flow through the pair of openings via at the other end of the piston sleeve;

the piston is moved to establish either of the first configuration and the second configuration by selective electrical excitation of the at least one electrical coil of the plurality of electrical coils; and the first body and second body provide at least one of fluidic channels through which fluid flows to and from the openings at either end of the fluidic device and part of at least one of a scaffold and casing of a device of which the fluidic device forms part.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 4 depicts a cross-sectional view and an exploded perspective view of a LMMC fluidic valve/switch as employed within the module depicted in FIG. 2 exploiting gate valve stop elements according to an embodiment of the invention disposed at either end of the LMMC fluidic valve/switch;

FIG. 8 depicts a cross-sectional view and an exploded perspective view of a LMMC fluidic valve/switch as employed within the module depicted in FIG. 2 exploiting block valve stop elements according to an embodiment of the invention disposed at either end of the LMMC fluidic valve/switch;

FIG. 12A depicts cross-sections of LMMC fluidic valve/switch elements according to embodiments of the invention exploiting different valve stop element geometries with hard and soft materials for the valve stop elements in conjunction with a hard magnetic piston;

FIG. 12B depicts cross-sections of LMMC fluidic valve/switch elements according to embodiments of the invention exploiting hard ended piston—soft block valve elements and soft ended piston—hard block valve elements respectively;

DETAILED DESCRIPTION

Figure 1:
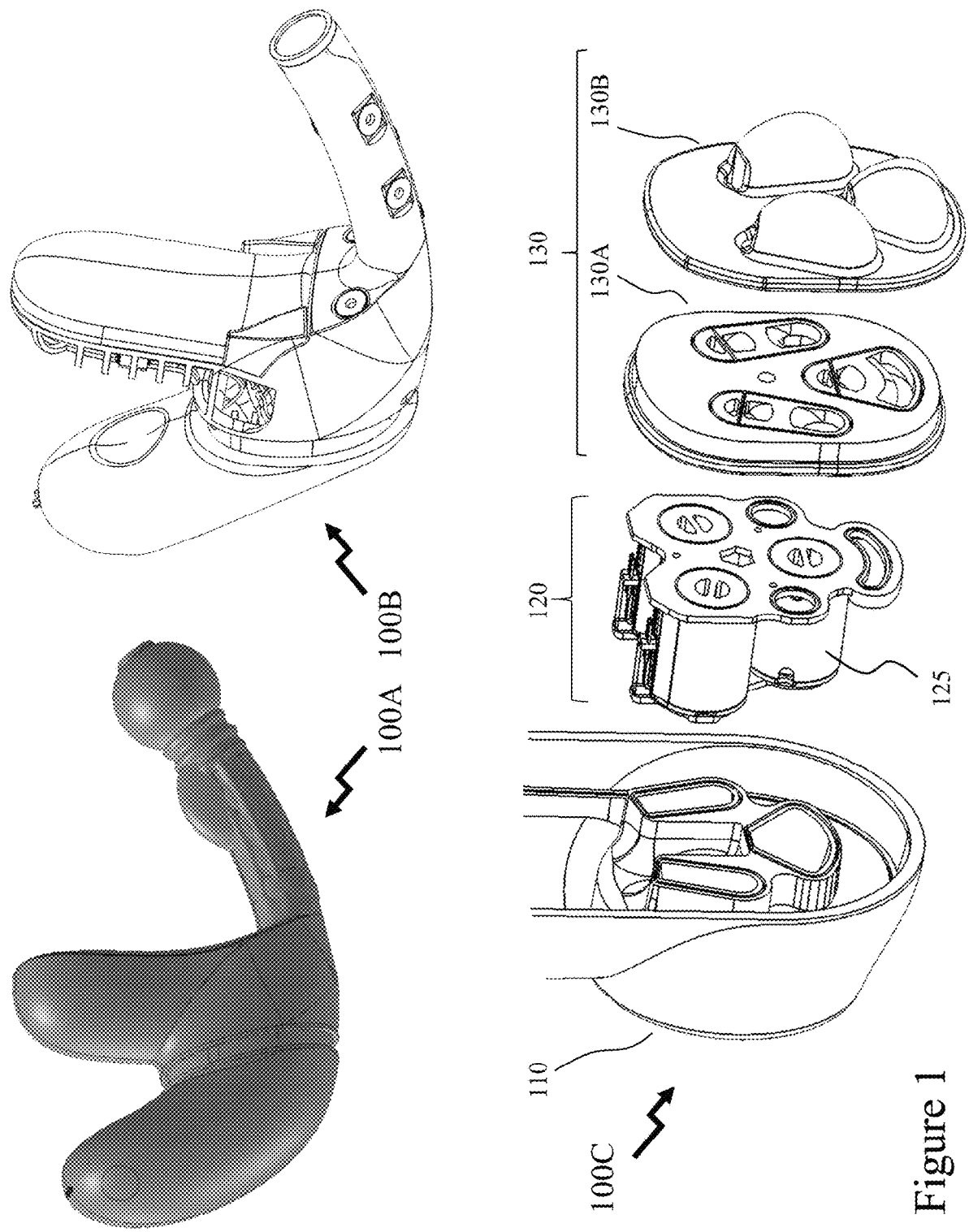
FIG. 1 depicts a perspective view of a fluidic switch module exploiting linear magnetic moveable core (LMMC) fluidic valves/switches according to an embodiment of the invention.

The present invention is directed to fluidic motors and pumps and more particularly to fluidic valves and switches and more particularly to fluidic valves and switches for consumer and non-consumer applications offering high efficiency, small footprint, low complexity and low cost.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "scaffold" or "scaffolds" as used herein, and throughout this disclosure, refers to a structure that is used to hold up, interface with, or support another material or element(s). This includes, but is not limited to, such two-dimensional (2D) structures such as substrates and films, three-dimensional (3D) structures such as geometrical objects, non-geometrical objects, combinations of geometrical and non-geometrical objects, naturally occurring structural configurations, and manmade structural configurations. A scaffold may be solid, hollow, and porous or a combination thereof. A scaffold may contain recesses, pores, openings, holes, vias, and channels or a combination thereof. A scaffold may be smooth, textured, have predetermined surface profiles and/or features. A scaffold may be intended to support one or more other materials, one or more films, a multilayer film, one type of particle, multiple types of particles etc. A scaffold may include, but not be limited to, a spine of a device and/or a framework, for example, which also supports a shell and/or a casing.

A "shell" as used herein, and throughout this disclosure, refers to a structure that is used to contain and/or surround at least partially and/or fully a number of elements within adult devices according to embodiments of the invention. A shell may include, but not limited to, a part or parts that are mounted to a scaffold or scaffolds that support elements within a device according to an embodiment of the invention.

A "casing" as used herein, and throughout this disclosure, refers to a structure surrounding a scaffold and/or shell. This includes structures typically formed from an elastomer and/or silicone to provide a desired combination of physical tactile surface properties to the device it forms part of and other properties including, but not limited to, hermeticity, liquid ingress barrier, solid particulate ingress barrier, surface sheen, and colour. A casing may include, but not limited to, a part or parts that are mounted to a scaffold or scaffolds and/or a casing or casings forming part of a device according to an embodiment of the invention.

A "plastic" as used herein, and throughout this disclosure, refers to a synthetic or semi-synthetic organic compound which may include, but are not limited to, one or more polyesters, one or more thermoplastics, one or more thermosetting polymers, one or more elastomers, and one or more silicones. A plastic may exploit the one or more materials discretely or in combination with one or more materials to adjust the plastics physical properties such as graphite fibers, aramid fibers, etc.

A "polyester" as used herein, and throughout this disclosure, refers to a category of polymers that contain the ester functional group in their main chain. This includes, but is not limited to polyesters which are naturally occurring chemicals as well as synthetics through step-growth polymerization, for example. Polyesters may be biodegradable or not. Polyesters may be a thermoplastic or thermoset or resins cured by hardeners. Polyesters may be aliphatic, semi-aromatic or aromatic. Polyesters may include, but not be limited to, those exploiting polyglycolide, polylactic acid (PLA), polycaprolactone (PCL), polyhydroxyalkanoate (PHA), polyhydroxybutyrate (PHB), polyethylene adipate (PEA), polybutylene succinate (PBS), polyethylene terephthalate (PET), polybutylene terephthalate (PBT), polytrimethylene terephthalate (PTT), and polyethylene naphthalate (PEN).

A "thermoplastic" or "thermosoftening plastic" as used herein and throughout this disclosure, refers to a category of polymers that become pliable or moldable above a specific temperature and solidify upon cooling. Thermoplastics may include, but not be limited, polycarbonate (PC), polyether sulfone (PES), polyether ether ketone (PEEK), polyethylene (PE), polypropylene (PP), poly vinyl chloride (PVC), polytetrafluoroethylene (PTFE), polyimide (PI), polyphenylsulfone (PPSU), polychlorotrifluoroethene (PCTFE or PTFCE), florinated ethylene propylene (FEP), and perfluoroalkoxy alkane (PFA).

A "metal" as used herein, and throughout this disclosure, refers to a material that has good electrical and thermal conductivity. Such materials may be malleable and/or fusible and/or ductile. Metals may include, but not be limited to, aluminum, nickel, copper, cobalt, chromium, silver, gold, platinum, iron, zinc, titanium, and alloys thereof such as bronze, stainless steel, stainless steel, brass, and phosphor bronze.

An "aramid" as used herein, and throughout this disclosure, refers to an aromatic polyamide. Aramids are a class of materials fibers in which the chain molecules are highly oriented along the fiber axis, so the strength of the chemical bond can be exploited. Examples, include, but are not limited to fibers distributed under brand names such as Kevlar™, Technora™, Twaron™, Heracron™, Nomex™, Innegra S™ and Vectran™ as well as nylon and ultra-high molecular weight polyethylene.

A "silicone" as used herein, and throughout this disclosure, refers to a polymer that includes any inert, synthetic compound made up of repeating units of siloxane.

An "elastomeric" material or "elastomer" as used herein, and throughout this disclosure, refers to a material, generally a polymer, with viscoelasticity. Elastomers may include, but not be limited to, unsaturated rubbers such as polyisoprene, butyl rubber, ethylene propylene rubber, silicone rubber, fluorosilicone rubber, fluoroelastomers, perfluoroelastomers, and thermoplastic elastomers.

"Rubber" as used herein, and throughout this disclosure, refers to either natural rubber comprising poly-cis-isoprene or "synthetic rubber" which refers to a subset of elastomers made from various petroleum-based monomers. Synthetic rubbers may include styrene-butadiene rubbers (SBR) derived from the copolymerization of styrene and 1,3-butadiene or other synthetic rubbers prepared from isoprene (2-methyl-1,3-butadiene), chloroprene (2-chloro-1,3-butadiene), and isobutylene (methylpropene) with a small percentage of isoprene for cross-linking.

"Elastic modulus" (also known as modulus of elasticity) as used herein, and throughout this disclosure, refers to a material's resistance to being deformed elastically (i.e., non-permanently) when a stress is applied to it. The elastic modulus of a material is defined as the slope of its stress-strain curve within its elastic deformation region. Stiffer materials will have a higher elastic modulus. The three primary elastic moduli are Young's modulus, which describes a material's tensile elasticity; shear modulus or modulus of rigidity which describes a material's tendency to shear; bulk modulus which describes a material's volumetric elasticity; as well as Poisson's ratio, Lame's first parameter, and P-wave modulus.

A "magnet" as used herein, and throughout this disclosure, refers to material or object that produces a magnetic field which is made from a material that is magnetized and creates its own persistent magnetic material.

A "magnetic material" as used herein, and throughout this disclosure, refers to a material that is magnetized and creates its own persistent magnetic material. These may be magnetically soft materials which can be magnetised but do not tend to stay magnetised or magnetically hard materials which do stay magnetised. Such magnetic materials may include, but are not limited to, a ferromagnetic material such as iron; nickel; cobalt; ferrite; alnico, a family of iron alloys composed primarily of aluminium (Al), nickel (Ni), and cobalt (Co) but may also include copper (Cu) and titanium (Ti); some alloys of rare-earth metals such as those based around neodymium (e.g. $Nd_2Fe_{14}B$), samarium-cobalt (e.g. $SmCo_5$ and $Sm(Co,Fe,Cu,Zr)_7$, and strontium-ferrite (Sr-ferrite).

A "piston" as used herein, and throughout this disclosure, refers to an axial permanent magnet having a predetermined cross-section intend to fit within and move within a sleeve, i.e. piston sleeve. The piston may be formed solely from a permanent magnetic material such as AlNiCo or neodymium for example. Alternatively, it may be formed from a pair of permanent magnetic material end "washers" and a central body of iron for example or a pair of permanent magnetic axial elements.

A "fluidic device" or "fluidic system" as used herein, and throughout this disclosure, refers to a fluidic device, subsystem or system exploiting fluidics for motion and/or actuation at least in part. A fluidic device may be discrete or combined with other elements/devices/systems/sub-systems to provide one or more functions within a consumer or non-consumer device/system/sub-system. Such devices may, for example, be partially or wholly inserted within an orifice of the human body; attached and/or mounted to engage a specific region or portion of the user's body; worn by the user including those under, within, with or on top of clothing; mounted upon a surface and/or object allowing interaction with a user; be interactive with a user or users; and provide discrete and/or combined functions independent of the presence or absence of a user; and be part of mobile and/or non-mobile robotic systems. Such fluidic devices may be functional, aesthetic, therapeutic, non-medical, and medical (e.g. drug delivery systems, medical testing and diagnosis devices).

An "opening" or "inlet port" or "outlet port" as used herein, and throughout this disclosure, refers to a channel through one or more elements forming part of a device or assembly according to an embodiment of the invention through which fluid can flow.

Within the following description with respect to embodiments of the invention described in respect of FIGS. 1 to 19B a material may be referred to as being "hard." A "hard" material being one having a high elastic modulus, i.e. a high force per unit area is needed to achieve a given amount of distortion. Within the following description with respect to embodiments of the invention described in respect of FIGS. 1 to 19B a material defined as being "soft." A "soft" material being one having a low elastic modulus, i.e. a low force per unit area is needed to achieve a given amount of distortion. This elastic modulus typically being the material's Young's modulus which describes tensile elasticity, or the tendency of an object to deform along an axis when opposing forces are applied along that axis or alternatively the material's bulk modulus which describes volumetric elasticity, or the tendency of an object to deform in all directions when uniformly loaded in all directions. The bulk modulus is an extension of Young's modulus to three dimensions and is the inverse of a materials compressibility.

It would be appreciated by one of skill in the art that the terms "hard" and "soft" are relative in that, for example, plastic is hard relative to an elastomer but is soft relative to steel. Accordingly, the terms are not intended to limit the materials employed in providing interfaces that come into contact with one being "hard" and the other "soft."

Within the following description for the sake of providing references associated with embodiments of the invention references are made to a particular product category or product, e.g. massagers, toys, robotic systems, adult toys etc., however such associations are purely for sake of improving the reader's understanding of the embodiments of the invention and are not intended to limit or define the applications of the different aspects of the invention and embodiments of the invention.

ELECTROMAGNETIC VALVES/SWITCHES: Referring to FIG. 1 there is depicted a perspective view of a fluidic consumer device in first image 100A which comprises an electromagnetic pump (ELPUMP) coupled to a fluid reservoir and therein via a fluidic switch module to a plurality of fluidic actuators that provide for functionality and user configurability of the fluidic consumer device 100A. Such functionality and user configurability including, but not limited to, dimensional adjustments such as length, diameter etc.; geometrical adjustments such as rotation, flex, etc.; and actuation such as high frequency vibration, low frequency vibration, etc. The ELPUMP, reservoir, fluidic switch module etc. are within a scaffold, depicted in second image 100B, which may "skinned" with one or more casings and/or shells typically formed from one or more plastic materials and/or elastomeric materials as depicted in first image 100A. An example of a fluidic valve/switch module providing programmable control of the fluid within the fluidic actuators is depicted in third image 100C of FIG. 1. The fluidic valve/switch module comprising a fluidic valve/switch assembly (FVSMA) 120 disposed between an inlet manifold 110, and outlet manifold 130 formed from manifold plate 130A and manifold cap 130B. As depicted the FVSMA 120 gas three linear magnetic moveable core (LMMC) fluidic valve/switch elements (FVSEs) 125. According to the product, the functionality of the product, the configurability of the product etc. the number of LMMC-FVSEs within the FVSMA may vary. Each LMMC-FVSE 125 may be coupled to one or more fluidic actuators and driven under control of a control circuit to provide the desired fill/empty of the fluidic actuators for low frequency variations such as dimensions, geometric etc. as well as modulation for vibration etc. Optionally, the product may contain multiple FVSMAs coupled to a single ELPUMP or it may contain multiple FVSAMs coupled to multiple ELPUMPs where the number of LMMC-FVSEs within each FVSAM may be the same or vary.

Figure 2:
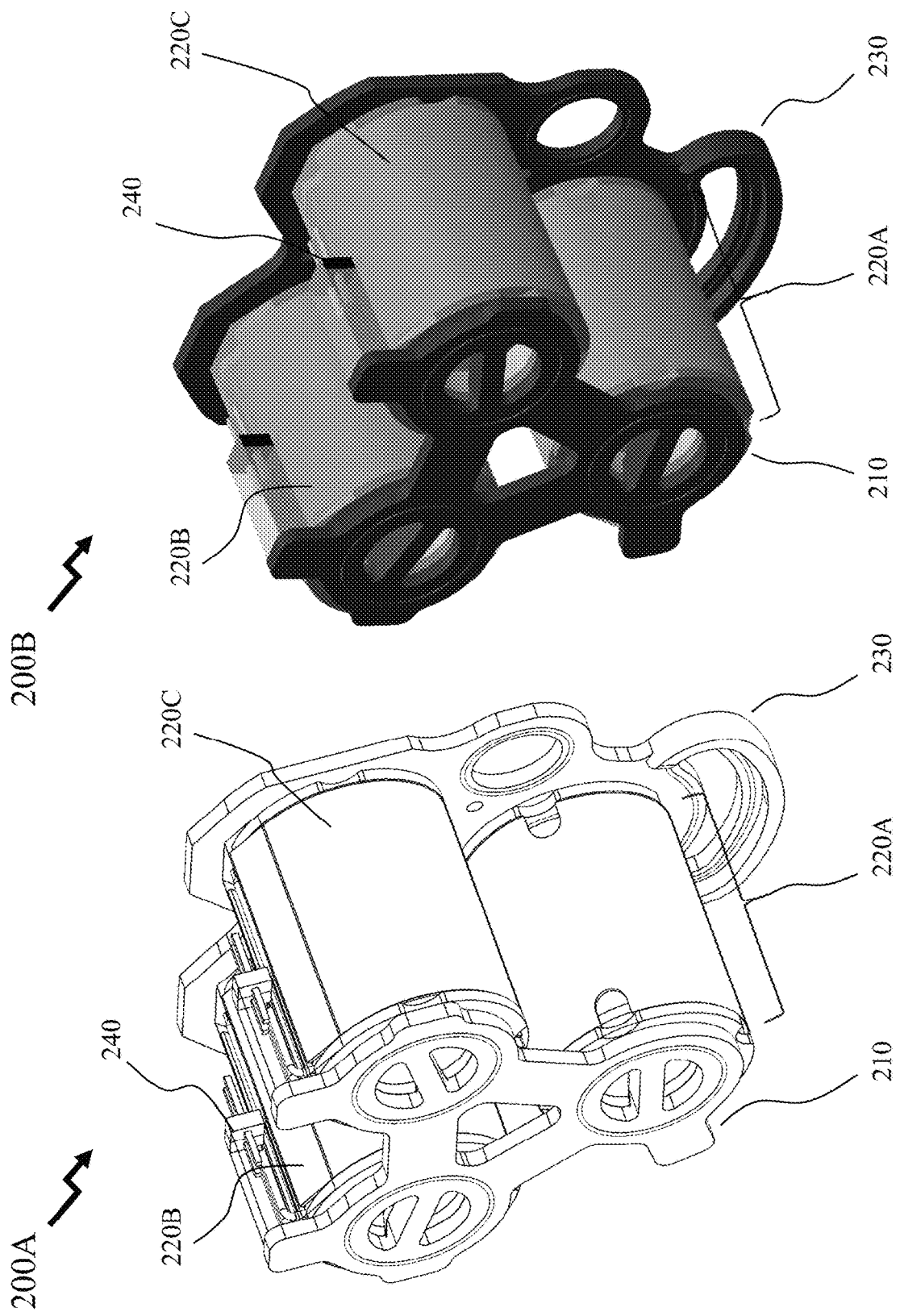
FIG. 2 depicts a perspective view of a set of LMMC fluidic valve/switch elements exploiting embodiments of the invention exploiting a common sheet of valve stop elements according to an embodiment of the invention disposed at either end of the LMMC fluidic valve/switch elements.

Referring to FIG. 2 there are depicted first and second perspective views 200A and 200B of the FVSAM 120 depicted in third image 100C of FIG. 1. Accordingly, the FVSAM comprises first to third LMMC-FVSE 220A, 220B and 220C which are disposed between a first sheet 210 of valve stop elements and a second sheet 230 of valve stop elements. Each of the first to third LMMC-FVSE 220A, 220B and 220C having an electrical connector 240 for receiving the electrical drive signals that actuate the motion of the magnetic piston with each of the first to third LMMC-FVSE 220A, 220B and 220C through energising one or other of a pair of coils surrounding a sleeve within which the piston moves. Movement of a piston within an FVSE to either the end of the FVSE with the first sheet 210 of valve stop elements or the second sheet 230 of the valve stop elements results in the piston no longer blocking the openings with the second sheet 230 of valve stop elements or the first sheet 210 of the valve stop elements and therein opening that valve or switch. Accordingly, the elements of an FVSE such as those depicted in FIG. 2 are depicted within FIG. 3 with first and second cross-sectional perspective images 300A and 300B respectively as:

First sheet 310 of first gate valve stop elements;
Second sheet 330 of second gate valve stop elements;
First magnetic washer 340;
Second magnetic washer 350;
First coil 360;
Second coil 370;
Piston 380, which is magnet, i.e. formed from a permanent magnetic material such as a "hard" ferromagnetic material for example;
Inner sleeve 390, formed from a non-magnetic material; and
Outer sleeve 395, formed from a magnetic material.

Accordingly, the piston when engaged against the first valve stop element 315 on the first sheet 310 blocks fluid flow between the first port 300C and second port 300D but fluid flow now can occur between third port 300E and fourth port 300F. When the piston is engaged against the second valve stop element 335 on the second sheet 330 fluid flow between the third port 300E and fourth port 300F but fluid flow now can occur between first port 300C and second port 300D. If the piston 380 is formed from a magnetic material, then when the piston is driven to the first valve stop element 315 to block fluid flow between the first port 300C and second port 300D the piston 380 is retained in position when the coil(s) are not energised by the first magnetic washer 340. Similarly, when the piston is driven to the second valve stop element 335 to block fluid flow between the third port 300E and fourth port 300F the piston 380 is retained in position when the coil(s) are not energised by the second magnetic washer 350. Accordingly, power consumption is minimised as the magnetic washers retain the piston in position until their retentive magnetic force is overcome by the magnetic force on the piston 380 generated by the first and/or second coils 360 and 370 respectively.

The first and second coils 360 and 370 respectively are energised such that the coils as depicted end to end have their outer faces having the same pole (e.g. north or south) and hence their inner faces the same opposite poles (e.g. south or north). The magnet is axially magnetized, i.e. north at one end and south at the other. Within embodiments of the invention the first and second coils 360 and 370 respectively can be energized at the same time, e.g. they are wired in series or parallel and excited by the same electrical source or controlled separately with precise phase or lag timed with respect to each other and the time required for magnet piston to go from one end to the other. It would be evident that precise timing and magnetic power of each coil, along with the current pulse shape or waveform, that efficiency of the electrical drive may be improved.

It would also be evident that too high a magnetic force applied to the magnetic piston can cause the magnet to bounce off the receiving end and therefore not latch against that end such that the switch or valve fails. However, with too small a magnetic force applied to the magnetic piston then the magnet may fail to reach the end against the fluid pressure and similarly not latch and therefore the switch or valve again fails. Accordingly, within embodiments of the invention sufficient magnetic force is applied to the magnet with a first electrical pulse applied to the coils to ensure that it reaches from one end to the other but once the piston has arrived at the other end a second short electrical pulse is applied to ensure that the piston is latched and stable at the far end.

As evident in first and second images 300A and 300B respectively each of the first valve stop element 315 and the second valve stop element 335 project through the respective one of the first magnetic washer 340 and second magnetic washer 350. Now referring to FIG. 4 there are depicted first and second images 400A and 400B respectively depicting a cross-sectional view and an exploded perspective view of a LMMC-FVSE as employed within the FVSAM 120 depicted in FIG. 2 exploiting gate valve stop elements according to an embodiment of the invention disposed at either end of the LMMC-FVSE. As evident in first image 400A the first valve stop element 315 of first sheet 310 projects through the opening of the first magnetic washer 340 to a distance $l_1$ whilst the second valve stop element 335 of the second sheet 330 projects through the opening of the second magnetic washer 350 to a distance $l_2$. The magnetic retention of the magnetic piston 380 to either the first magnetic washer 340 or second magnetic washer 350 is determined by the magnetic strength of the piston 380, the magnetic strength of either the first magnetic washer 340 or second magnetic washer 350, and either the respective first distance $l_1$ or second distance $l_2$. The larger the distance between end of the valve stop element which abuts the end face of the piston 380 and the magnetic washer then the lower the magnetic retention force and the lower the reverse magnetic force required to move the piston in the reverse direction. The lower the reverse magnetic force the lower the electrical power consumption required to reverse the FVSE from closed for that pair of openings to open.

The magnetic retentive force required for maintaining the piston in the position to close the fluidic connection between the openings at an end of a FVSE is dependent upon the fluidic pressure at that point in the fluidic system. Within many fluidic systems such as where the FVSE couples fluid from a reservoir under pressure with pressure flow generated by an ELPUMP to an actuator on one side and from the actuator to a reservoir at lower pressure from which the ELPUMP draws. Accordingly, the fluid pressure on one side of the FVSE is different to that of the FVSE on the other side. If electrical power consumption of the device of which the fluidic system comprising the FVSE(s) is not limited such as a device pulling power from an electrical supply such as 120V, 240V mains electricity, then minimizing the electrical consumption of the FVSE may not be of concern. However, in portable device applications reducing power consumption is important for increasing the duration that the device can be used particularly where there are multiple FVSEs and they are required to open/close/modulate at increasing rates according to the operating mode of the device.

Accordingly, FVSEs according to embodiments of the invention allow for the respective distances $l_1$ and $l_2$ to be established differently on each side in dependence upon the pressure that the piston within the FSVE must hold off when closed. Additionally, the pressure being held off can be adjusted within a predetermined range established in dependence upon the magnetic strength of the piston and magnetic washer by changing the distance between the end of the gate valve element and the magnetic washer. Accordingly, with a FVSAM employing FVSEs then all FVSEs can be adjusted simultaneously by replacing the sheet of gate valve elements with a different sheet providing a different distance. Optionally, rather than each sheet of gate valve elements providing a common distance for each FVSE the sheet may be formed with different distances for each FVSE assembled to it.

Referring to second image 400B in FIG. 4 then the elements of a single FVSE 450 such as those depicted in FIG. 2 with FVSE 220A, 220B and 2200C are depicted in an exploded perspective view together with the first sheet 310 of stop valve elements and second sheet 330 of stop valve elements which provide the appropriate standoff distances for the piston 380 at either end of the FVSE 450 for all three FVSEs 450 with the FVSAM 120 depicted in third image 100C in FIG. 1. Accordingly, the FVSE 450 comprises:
  First magnetic washer 340;
  Second magnetic washer 350;
  First coil 360;
  Second coil 370;
  Piston 380;
  Inner sleeve 390;
  Outer sleeve 395; and
  Electrical connector 410.

The inlet and outlet ports of the FVSE on one end are defined by the sheet of stop valve elements within the inner opening of the magnetic washer. As the sheets of gate valve elements and the magnetic washers are each on the outer end of the FVSE then adjusting the magnetic strength of one or both of the magnetic washers and the respective standoff distances $l_1$ and $l_2$ is simple and straight forward allowing the other elements of the dual coil FVSE to be assembled and employed within multiple products. Similarly, different geometries of first and second coils 360 and 370 may provide different levels of electromagnetic activation for the piston where stronger or weaker magnetic washers are employed.

Figure 5:
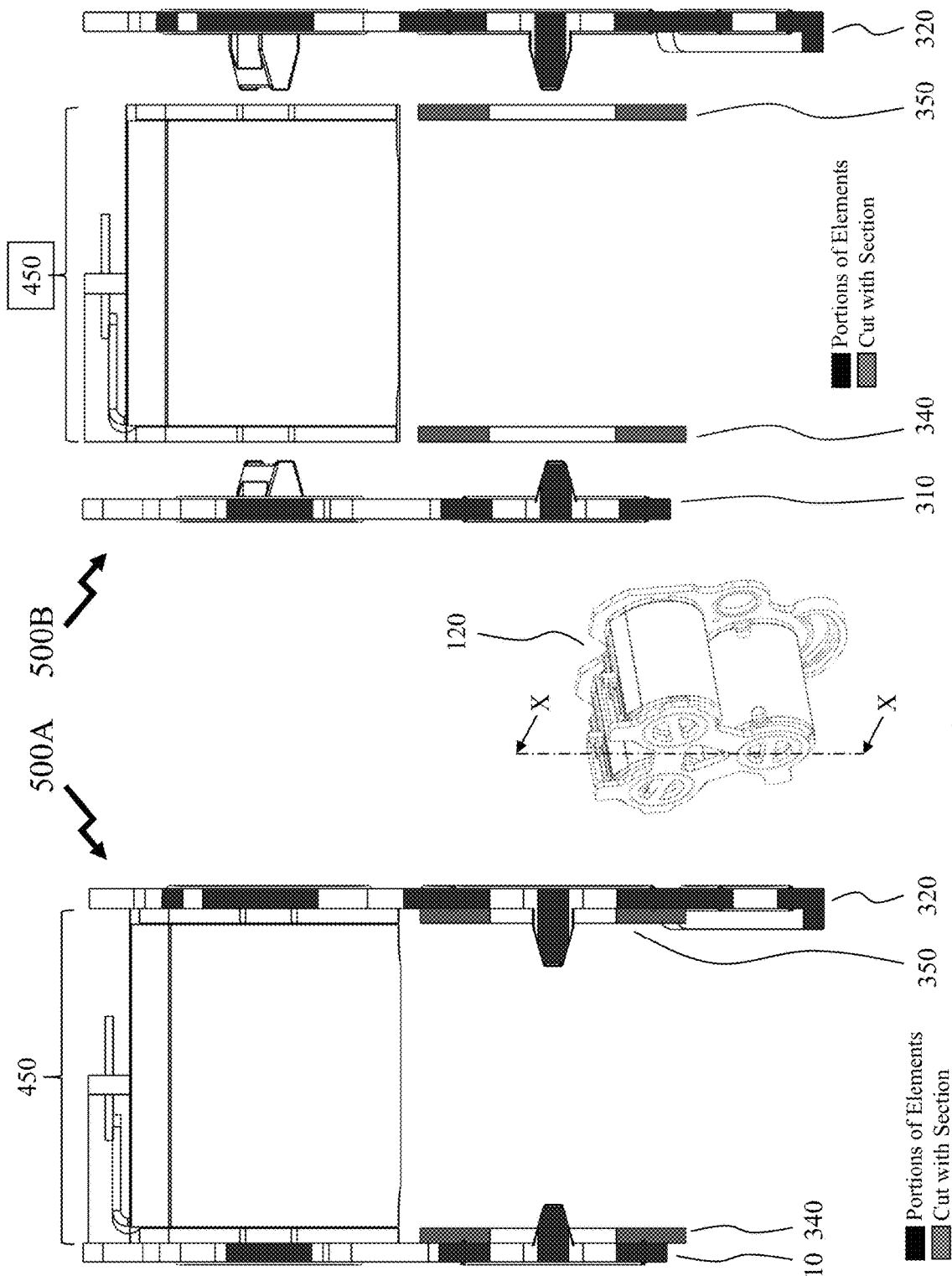
FIG. 5 depicts cross-sectional assembled and partially exploded views of the LMMC fluidic valve/switch module of FIG. 2 with the elements removed from one LMMC fluidic valve/switch according to an embodiment of the invention apart from the gate valve stop elements and magnetic washers.
Figure 6:
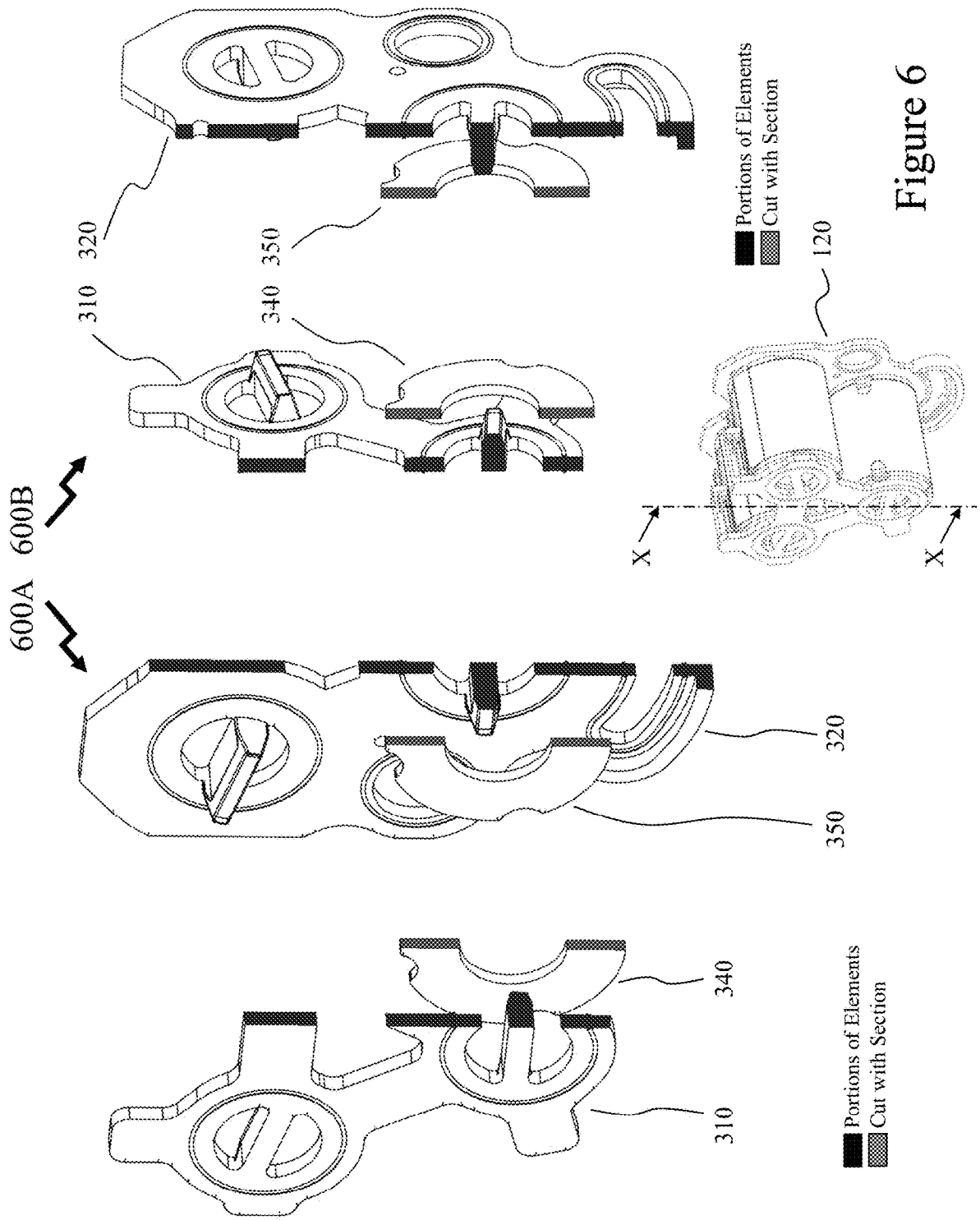
FIG. 6 depicts exploded cross-sectional views of the gate valve stop elements and magnetic washers according to an embodiment of the invention for the LMMC fluidic valve/switch module depicted in FIG. 2.

Referring to FIG. 5 and first and second images 500A and 500B respectively there are depicted cross-sectional assembled and partially exploded views of the FVSAM 120 module of FIG. 1 along the section line X-X with the elements removed from one LMMC-FVSE according to an embodiment of the invention apart from the gate valve stop elements and magnetic washers. Referring to FIG. 6 and first and second images 600A and 600B respectively there are depicted cross-sectional views of assembled and partially exploded magnetic washers and sheets of gate valve elements of the FVSAM 120 module of FIG. 1 along the section line X-X according to an embodiment of the invention with all other elements removed.

Figure 7:
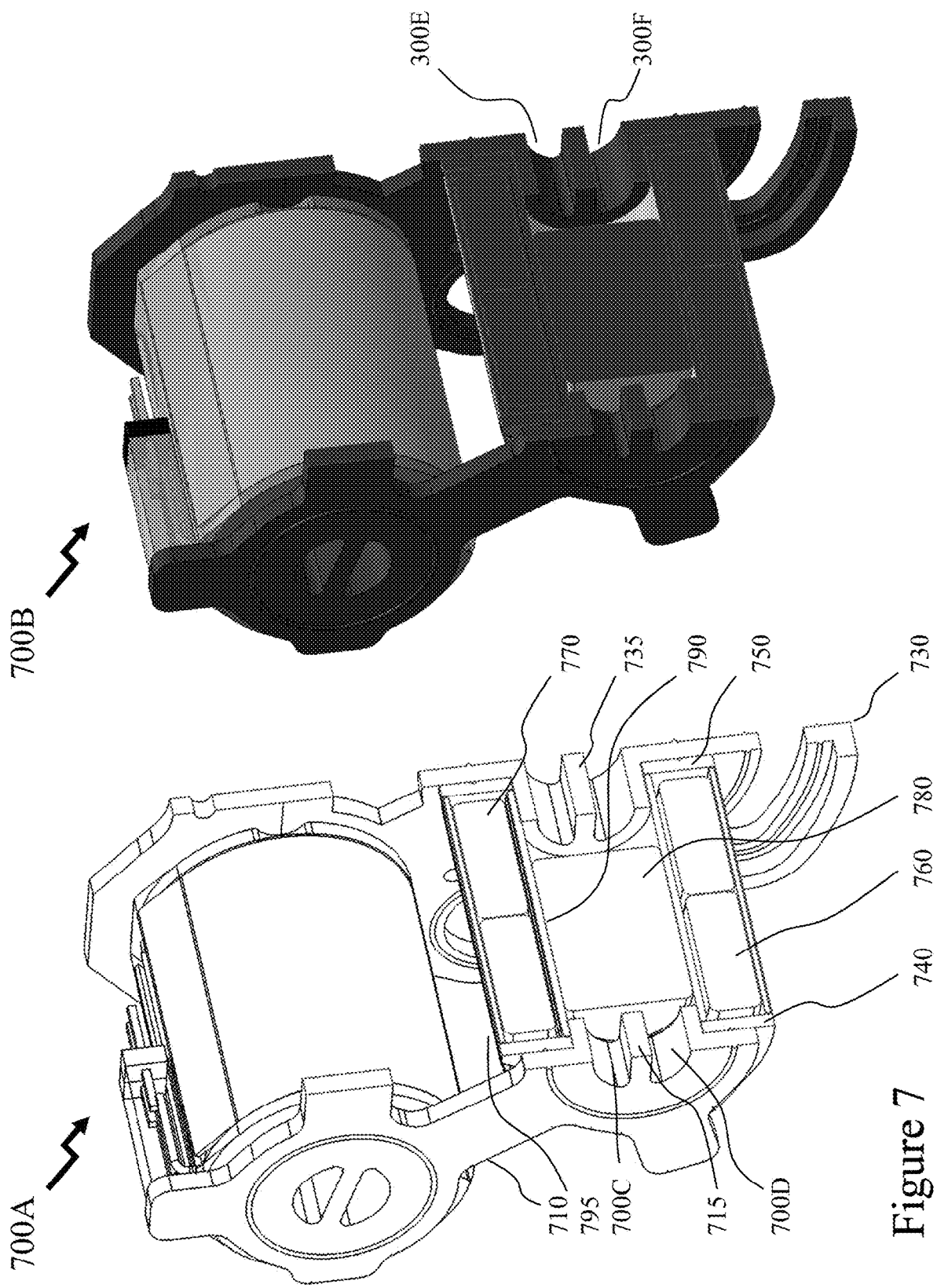
FIG. 7 depicts a cross-sectional perspective view of the set of LMMC fluidic valve/switch elements depicted in FIG. 2 exploiting a common sheet of block valve stop elements according to an embodiment of the invention disposed at either end of the LMMC fluidic valve/switch elements.

Now referring to FIG. 7 there are depicted the elements of an FVSE such as those depicted in FIG. 2 within first and second cross-sectional perspective images 700A and 700B wherein the gate valve elements and their respective sheets at either end of the FVSAM and each FVSE have been replaced with block valves. Accordingly, the elements of each FVSE are:
  First sheet 710 of first block valve stop elements;
  Second sheet 730 of second block valve stop elements;
  First magnetic washer 740;
  Second magnetic washer 750;
  First coil 760;
  Second coil 770;
  Piston 780;
  Inner sleeve 790; and
  Outer sleeve 795.

Accordingly, the piston now when engages against the first valve stop element 715 on the first sheet 710 and blocks fluid flow between the first port 700C and second port 700D but fluid flow now can occur between third port 700E and fourth port 700F. In contrast to the gate valves described and depicted in respect of FIGS. 3 to 6 where the gate valve fills the width of the bore of the inner shell that the piston moves within and the piston against the tip of the gate valve blocks fluid flow. Within the valve stop elements in FIGS. 7 to 10 respectively there is no projecting tip and the piston engages against the outer ring of the valve element and the valve stop element.

When the piston is engaged against the second valve stop element 735 on the second sheet 730 fluid flow between the third port 700E and fourth port 700F but fluid flow now can occur between first port 700C and second port 700D. If the piston 780 is formed from a magnetic material, then when the piston is driven to the first valve stop element 715 to block fluid flow between the first port 700C and second port 700D the piston 780 is retained in position when the coil(s) are not energised by the first magnetic washer 740. Similarly, when the piston is driven to the second valve stop element 775 to block fluid flow between the third port 700E and fourth port 700F the piston 780 is retained in position when the coil(s) are not energised by the second magnetic washer 750. Accordingly, power consumption is minimised as the magnetic washers retain the piston in position until their retentive magnetic force is overcome by the magnetic force on the piston 780 generated by the first and/or second coils 760 and 770 respectively.

As evident in first and second images 700A and 700B respectively each of the first valve stop element 715 and the second valve stop element 735 project through the respective one of the first magnetic washer 740 and second magnetic washer 750. Now referring to FIG. 8 there are depicted first and second images 800A and 800B respectively depicting a cross-sectional view and an exploded perspective view of a LMMC-FVSE as employed within the FVSAM 120 depicted in FIG. 2 exploiting gate valve stop elements according to an embodiment of the invention disposed at either end of the LMMC-FVSE. As evident in first image 800A the first valve stop element 715 of first sheet 710 projects through the opening of the first magnetic washer 740 to a distance $l_1$ whilst the second valve stop element 735 of the second sheet 730 projects through the opening of the second magnetic washer 750 to a distance $l_2$. The magnetic retention of the magnetic piston 780 to either the first magnetic washer 740 or second magnetic washer 750 is determined by the magnetic strength of the piston 780, the magnetic strength of either the first magnetic washer 740 or second magnetic washer 750, and either the respective first distance $l_1$ or second distance $l_2$. The larger the distance between end of the valve stop element which abuts the end face of the piston 780 and the magnetic washer then the lower the magnetic retention force and the lower the reverse magnetic force required to move the piston in the reverse direction. The lower the reverse magnetic force the lower the electrical power consumption required to reverse the FVSE from closed for that pair of openings to open.

The magnetic retentive force required for maintaining the piston in the position to close the fluidic connection between the openings at an end of a FVSE is dependent upon the fluidic pressure at that point in the fluidic system. Within many fluidic systems such as where the FVSE couples fluid from a reservoir under pressure with pressure flow generated by an ELPUMP to an actuator on one side and from the actuator to a reservoir at lower pressure from which the ELPUMP draws. Accordingly, the fluid pressure on one side of the FVSE is different to that of the FVSE on the other side. If electrical power consumption of the device of which the fluidic system comprising the FVSE(s) is not limited such as a device pulling power from an electrical supply such as 120V, 240V mains electricity, then minimizing the electrical consumption of the FVSE may not be of concern. However, in portable device applications reducing power consumption is important for increasing the duration that the device can be used particularly where there are multiple FVSEs and they are required to open/close/modulate at increasing rates according to the operating mode of the device.

Accordingly, FVSEs according to embodiments of the invention allow for the respective distances $l_1$ and $l_2$ to be established differently on each side in dependence upon the pressure that the piston within the FSVE must hold off when closed. Additionally, the pressure being held off can be adjusted within a predetermined range established in dependence upon the magnetic strength of the piston and magnetic washer by changing the distance between the end of the gate valve element and the magnetic washer. Accordingly, with a FVSAM employing FVSEs then all FVSEs can be adjusted simultaneously by replacing the sheet of gate valve elements with a different sheet providing a different distance. Optionally, rather than each sheet of gate valve elements providing a common distance for each FVSE the sheet may be formed with different distances for each FVSE assembled to it.

Referring to second image 800B in FIG. 8 then the elements of a single FVSE 850 such as those depicted in FIG. 2 with FVSE 220A, 220B and 2200C are depicted in an exploded perspective view together with the first sheet 710 of stop valve elements and second sheet 730 of stop valve elements which provide the appropriate standoff distances for the piston 780 at either end of the FVSE 850 for all three FVSEs 850 with the FVSAM 120 depicted in third image 100C in FIG. 1. Accordingly, the FVSE 850 comprises:

First magnetic washer 740;
Second magnetic washer 750;
First coil 760;
Second coil 770;
Piston 780;
Inner sleeve 790;
Outer sleeve 795; and
Electrical connector 410.

The inlet and outlet ports of the FVSE on one end are defined by the sheet of stop valve elements within the inner opening of the magnetic washer. As the sheets of gate valve elements and the magnetic washers are each on the outer end of the FVSE then adjusting the magnetic strength of one or both of the magnetic washers and the respective standoff distances $l_1$ and $l_2$ is simple and straight forward allowing the other elements of the dual coil FVSE to be assembled and employed within multiple products. Similarly, different geometries of first and second coils 760 and 770 may provide different levels of electromagnetic activation for the piston where stronger or weaker magnetic washers are employed.

Figure 9:
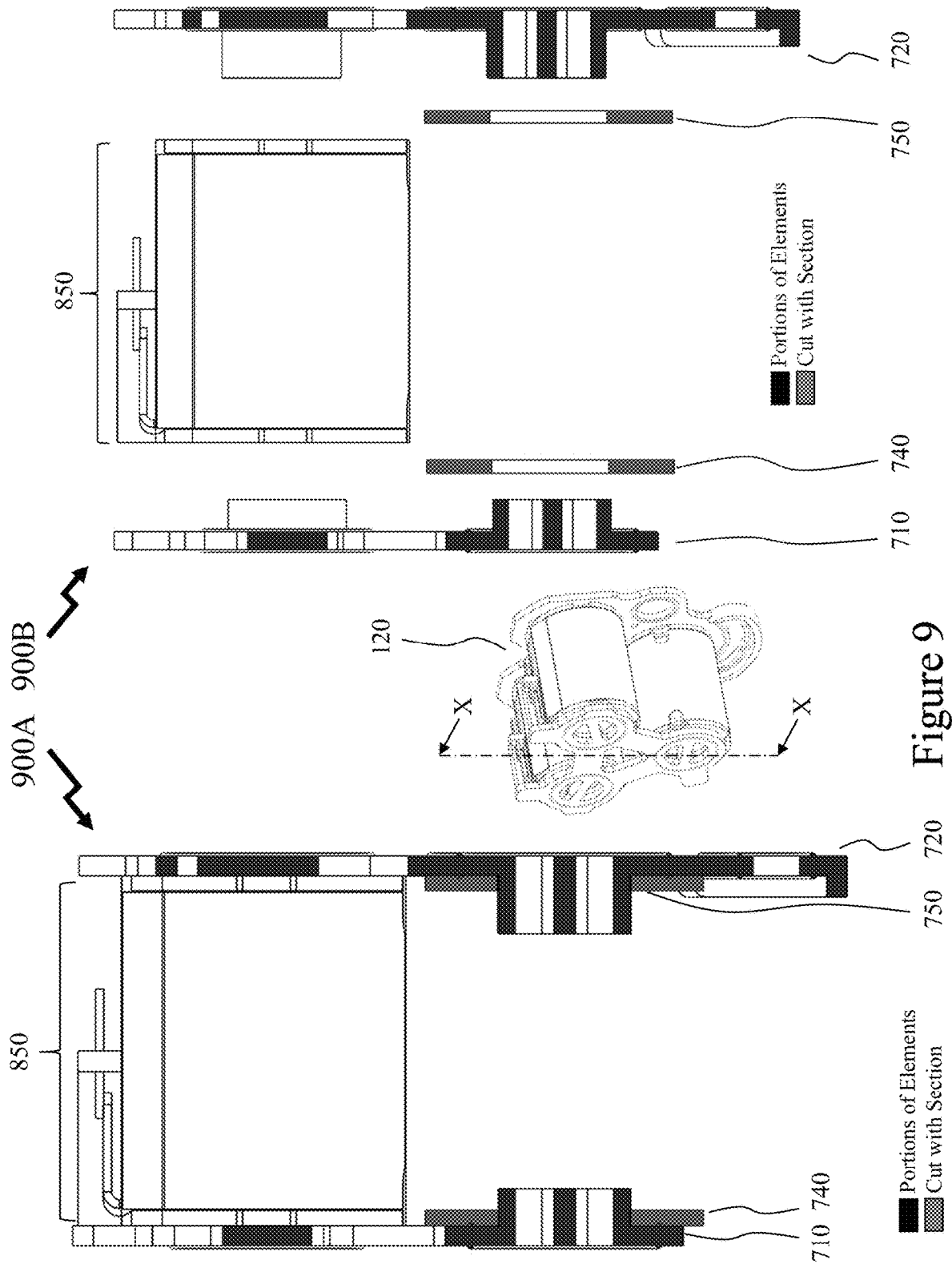
FIG. 9 depicts cross-sectional assembled and partially exploded views of the LMMC fluidic valve/switch module of FIG. 2 with the elements removed from one LMMC fluidic valve/switch according to an embodiment of the invention apart from the block valve stop elements and magnetic washers.
Figure 10:
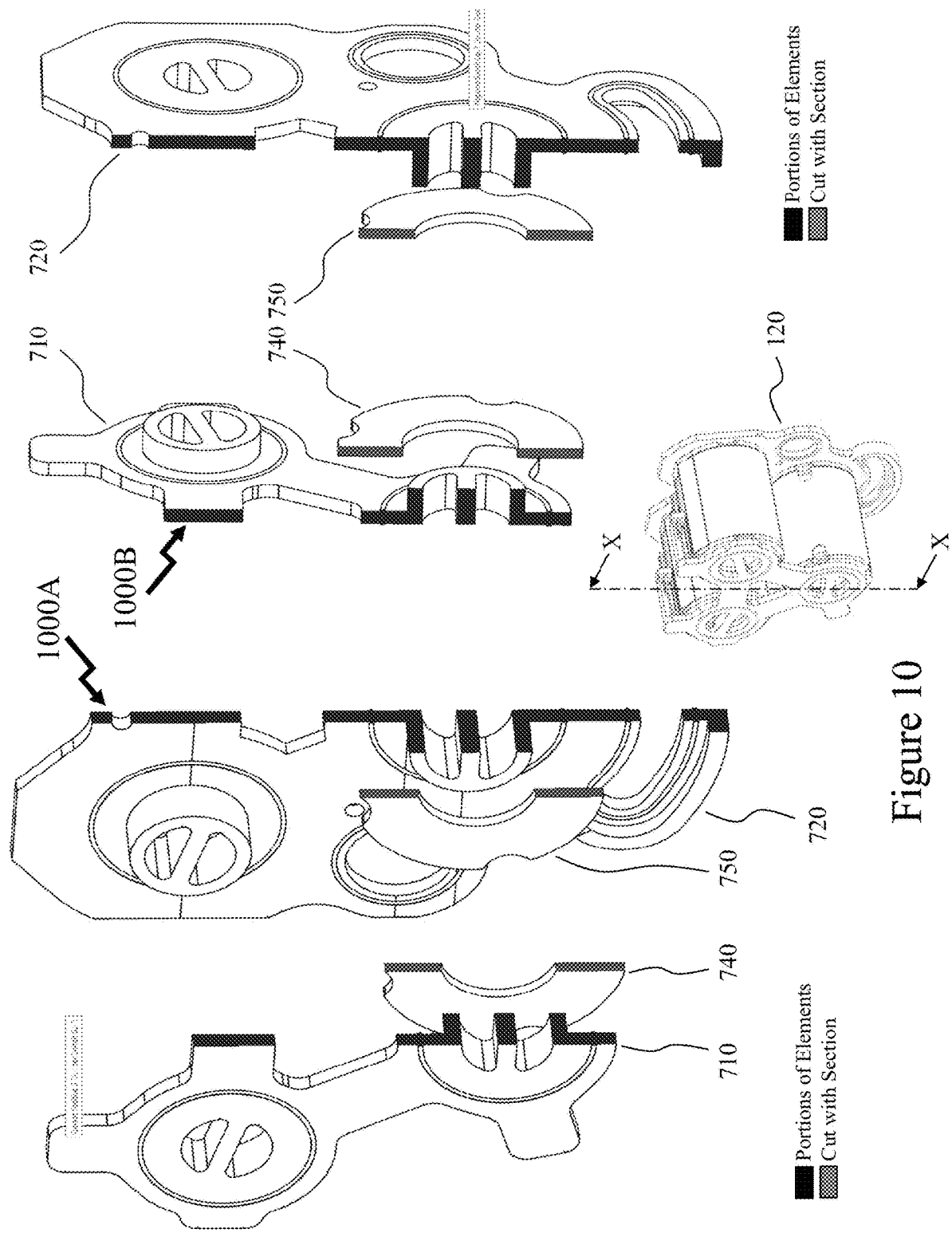
FIG. 10 depicts exploded cross-sectional views of the block valve stop elements and magnetic washers according to an embodiment of the invention for the LMMC fluidic valve/switch module depicted in FIG. 2.

Referring to FIG. 9 and first and second images 900A and 900B respectively there are depicted cross-sectional assembled and partially exploded views of the FVSAM 120 module of FIG. 1 along the section line X-X with the elements removed from one LMMC-FVSE according to an embodiment of the invention apart from the gate valve stop elements and magnetic washers. Referring to FIG. 10 and first and second images 1000A and 1000B respectively there are depicted cross-sectional views of assembled and partially exploded magnetic washers and sheets of gate valve elements of the FVSAM 120 module of FIG. 1 along the section line X-X according to an embodiment of the invention with all other elements removed.

Figure 3:
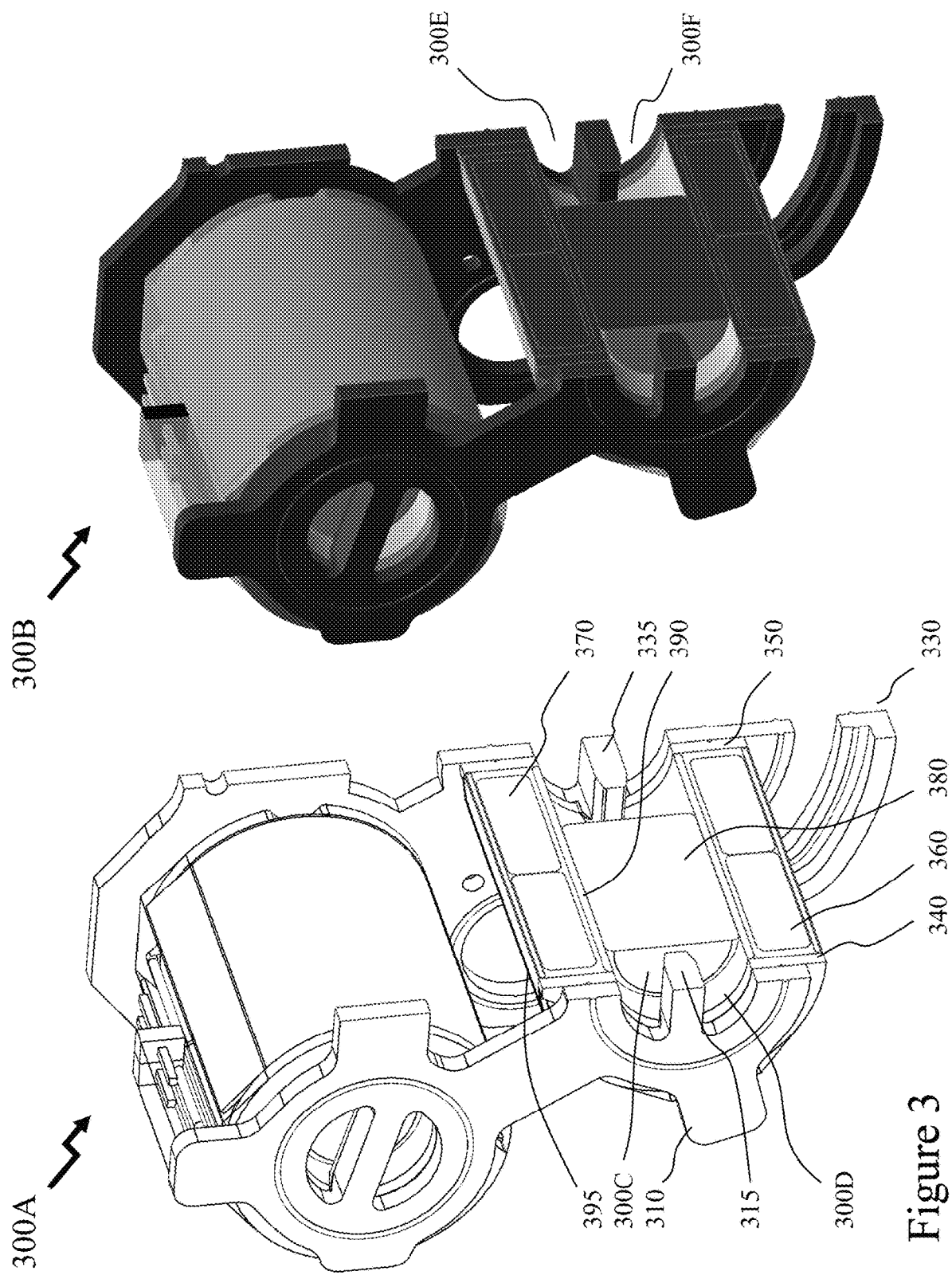
FIG. 3 depicts a cross-sectional perspective view of the set of LMMC fluidic valve/switch elements depicted in FIG. 2 exploiting a common sheet of gate valve stop elements according to an embodiment of the invention disposed at either end of the LMMC fluidic valve/switch elements.
Figure 11:
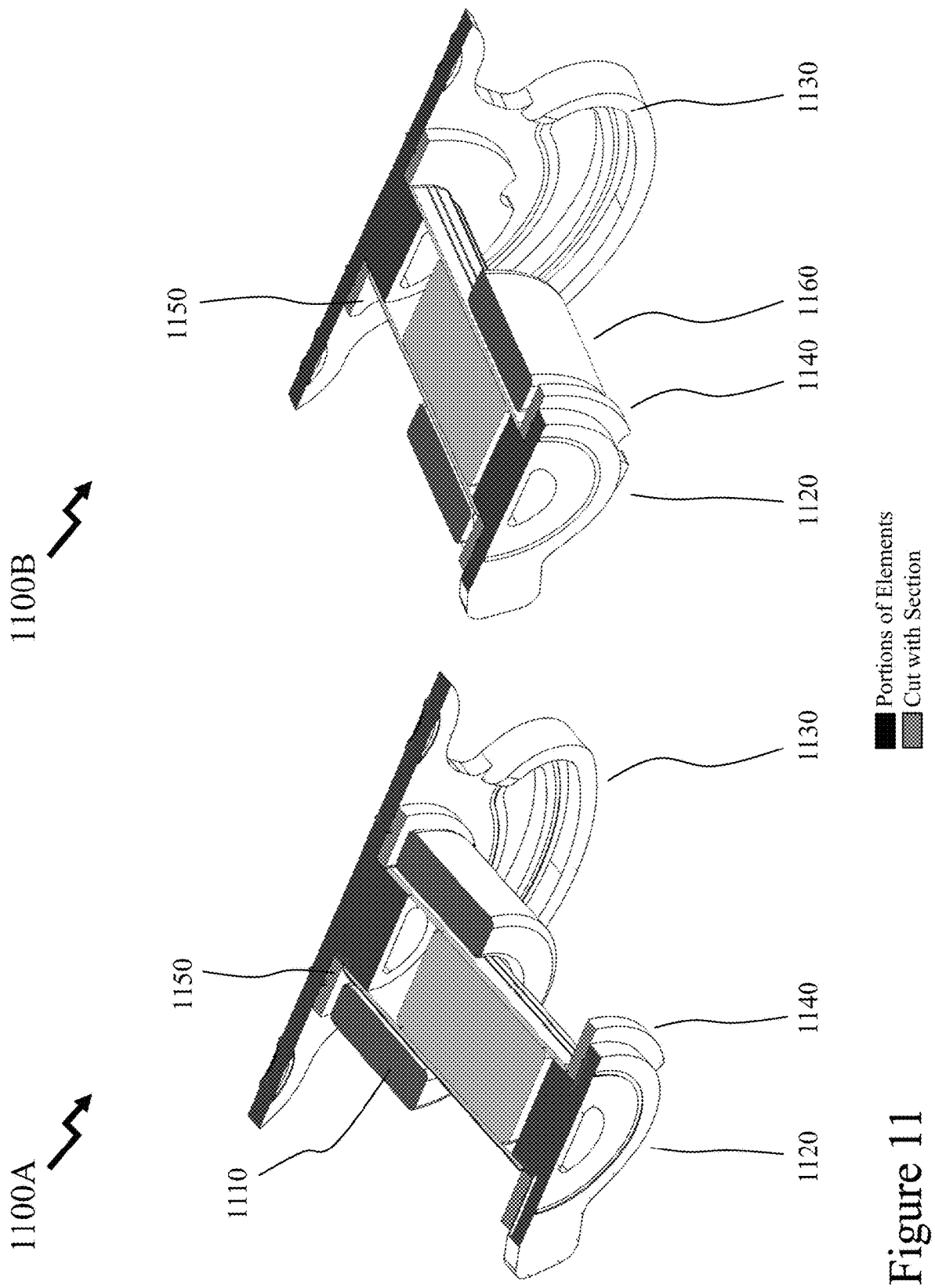
FIG. 11 depicts perspective cross-sectional views of single coil LMMC fluidic valve/switch assemblies exploiting gate valve stop elements according to an embodiment of the invention.

Within the embodiments of the invention described and depicted in respect of FIGS. 3 to 10 respectively the piston is driven to one end or the other of the FVSE under action of a pair of annular coils, such as first coil 360 and second coil 370 in FIG. 3 or first coil 760 and second coil 770 in FIG. 7. Alternatively, as depicted in FIG. 11 in first and second images 1100A and 1100B the piston may be driven to either end under the action of a single coil. Within each of the first and second images 1100A and 1100B at one end of the FVSE is first valve sheet 1120 and first magnet 1140 whilst at the other end there are disposed second valve sheet 1130 and second magnet 1150. Within first image 1100A the coil is first coil 1110 which is disposed towards the same end as second sheet 1130 and second magnet 1150 whilst within second image 1100B the coil is second coil 1160 disposed towards the end with first valve sheet 1120 and first magnet 1140. In common with the FVSEs depicted in FIGS. 3 to 10 respectively once driven to one end or the other the annular coil(s), e.g. first coil 1110 or second coil 1160, may be de-energized as the magnetic attraction between the magnet, e.g. first magnet 1140 or second magnet 1150 maintains the piston in position.

The magnetic force may be adjusted lower/higher by increasing/decreasing the distance that the valve, in FIG. 11 a gate valve, projects through the respective magnet(s). It would be evident that the same single coil FVSE as depicted in FIG. 11 may be employed with block valves such as depicted in FIGS. 7 to 10 respectively as opposed to the gate valves depicted in FIGS. 3 to 6 respectively. Whilst the embodiments of the invention described and depicted in respect of FIGS. 1 to 11 respectively these provide a valve/switch at each end of the FVSE it would be evident that alternatively other embodiments of the invention may exploit a valve/switch at only one end.

Within the embodiments of the invention described above in respect of FIGS. 1 to 11 above the FVSE and FVSAM modules employing the FVSE(s) exploit either a gate valve or block valve which engages against the end face of a piston to close the valve/switch when the piston is driven against the gate valve or block valve and the valve/switch opens when the piston is driven away from the gate valve/block valve. Within embodiments of the invention the piston is formed from a magnetic material which is metal and accordingly hard. The sheets of gate valve stop elements such as first sheet 310 and second sheet 330 in FIGS. 3 to 6 or sheets of valve stop elements such as first sheet 710 and second sheet 730 in FIGS. 7 to 10 may typically be formed from a plastic. Accordingly, the plastic may be hard, or it may be soft.

Referring to FIG. 12A there are depicted first to fourth images 1200A to 1200D. First and second images 1200A and 1200B depict a first configuration wherein a magnetic piston core 1230 is depicted away and in contact with a "hard" block valve end 1220 on a block valve 1210 respectively. Accordingly, as evident within second image 1200B when the magnetic piston core 1230 is driven to one end of the FVSE the "hard" valve end 1220 butts against the piston core 1230. In contrast, within third and fourth images 1200G and 1200H the magnetic piston core 1230 is depicted away from and in contact with a "soft" block valve end 1240 respectively. Accordingly, as evident within fourth image 1200H when the magnetic piston core 1230 is driven to one end of the FVSE the "soft" block valve 1240 deforms under contact with the piston 1230. "Soft" block valve end 1240 may be formed, for example, from an elastomer or rubber as may "hard" block valve end 1220 although with increased resiliency. Alternatively, "hard" block valve end 1220 may be formed from a suitable plastic, metal, ceramic or alloy.

Referring to FIG. 12B there are depict first to fourth images 1200E to 1200H. First and second images 1200E and 1200F depicted a first configuration wherein a magnetic piston core 1230 has a "soft" piston end portion 1260 away from and in contact with a "hard" block valve 1250. Accordingly, as evident within second image 1200F when the magnetic piston core 1230 is driven to one end of the FVSE the "soft" piston end 1260 deforms under contact with the "hard" block valve 1250. In contrast, within third and fourth images 1200G and 1200H the magnetic piston core 1230 has a "hard" piston end 1280 which is depicted away from and in contact with a "soft" block valve end 1270. Accordingly, as evident within fourth image 1200H when the magnetic piston core 1230 is driven to one end of the FVSE the "soft" block valve 1270 deforms under contact with the "hard" piston end 1280. "Soft" piston end portion 1260 and/or soft" block valve end 1270 may be formed, for example, from an elastomer or rubber whilst "hard" piston end 1280 may be formed from a suitable plastic, metal, ceramic or alloy.

Figure 13:
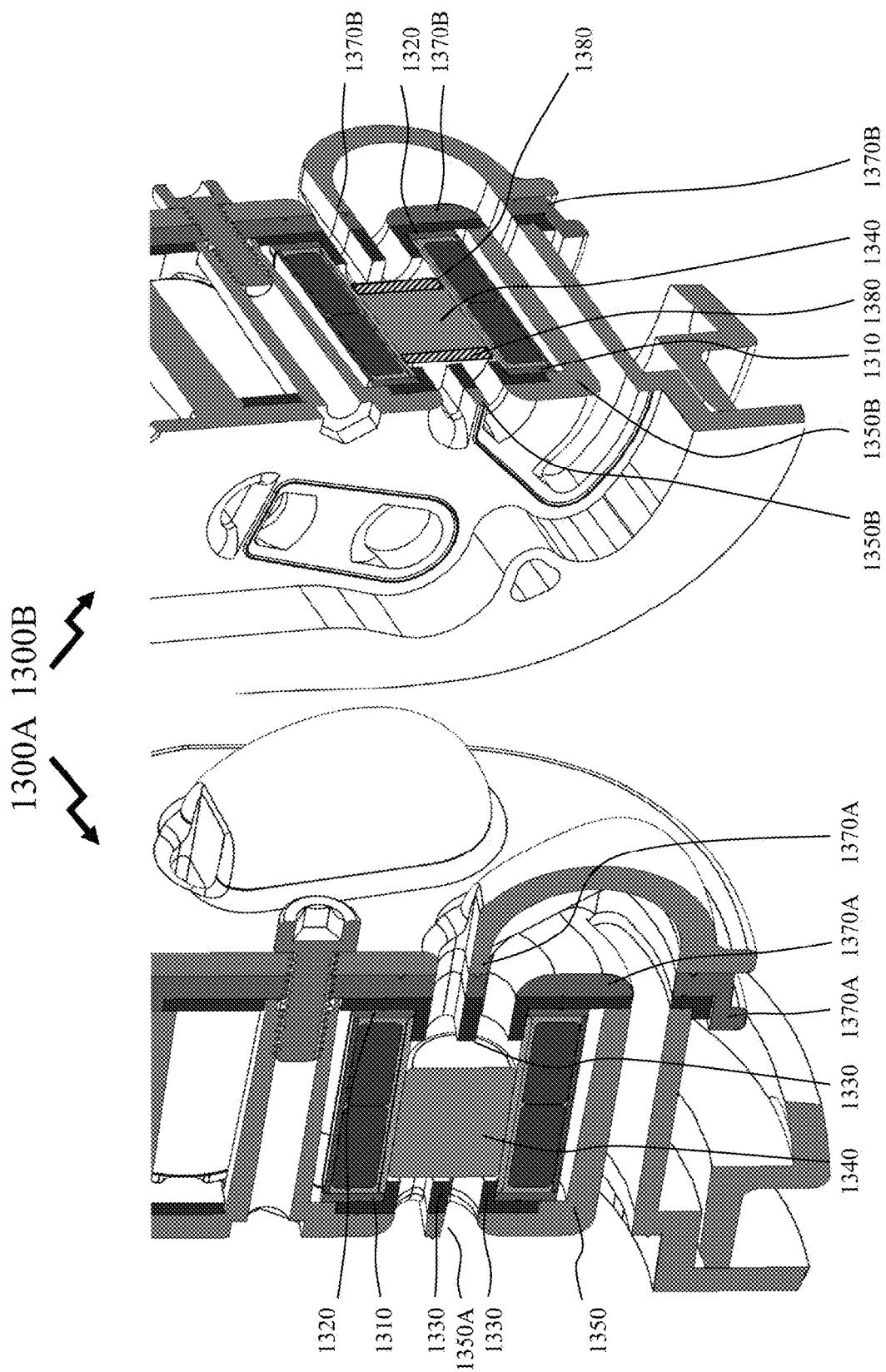
FIG. 13 depicts cross-sectional perspective views of LMMC fluidic valve/switch assembly variants of the module depicted in FIG. 1 according to an embodiment of the invention.

Now referring to FIG. 13 there are depicted perspective views in first and second cross-sections 1300A and 1300B respectively of LMMC fluidic valve/switch assembly variants of the module depicted in FIG. 1 according to an embodiment of the invention. Within first cross-section 1300A the FVSE is depicted within the FMSAM wherein the first piston 1340 engages "soft" elements 1330 which are formed upon the inner facing ends of a first left assembly body 1350A and a first right assembly body 1370A together with first magnet 1310 on the left hand end of the FVSE and second magnet 1320 on the right hand end of the FSVE. Accordingly, the module depicted in first cross-section 1300A provides the block valve elements through the combination of the first left assembly body 1350A with "soft" first elements 1330 and first right assembly body 1370A with "soft" first elements 1330 but does so without the sheet of block valve elements. The "soft" first elements 1330 therefore provide a surface that conforms to the end face of the first piston 1340 when the piston is driven to each end of the FVSE/FVSAM. Accordingly, the FVSE geometry depicted in first cross-section 1300A is similar to the geometry depicted in third and fourth images 1200G and 1200H of FIG. 12B.

Within second cross-section 1300B the first left assembly body 1350A, first right assembly body 1370A, first piston 1340, and "soft" first elements 1330 are replaced with second left assembly body 1350B, second right assembly body 1370B, second piston 1340, and "soft" second elements 1380. Accordingly, the ends of the second piston 1340 are now covered with "soft" second elements 1380 and engage the "hard" inward facing portions of the second left assembly body 1350B and second right assembly body 1370B. Accordingly, the FVSE geometry depicted in second cross-section 1300B is similar to the geometry depicted in first and second images 1200E and 1200F of FIG. 12B.

Figure 14:
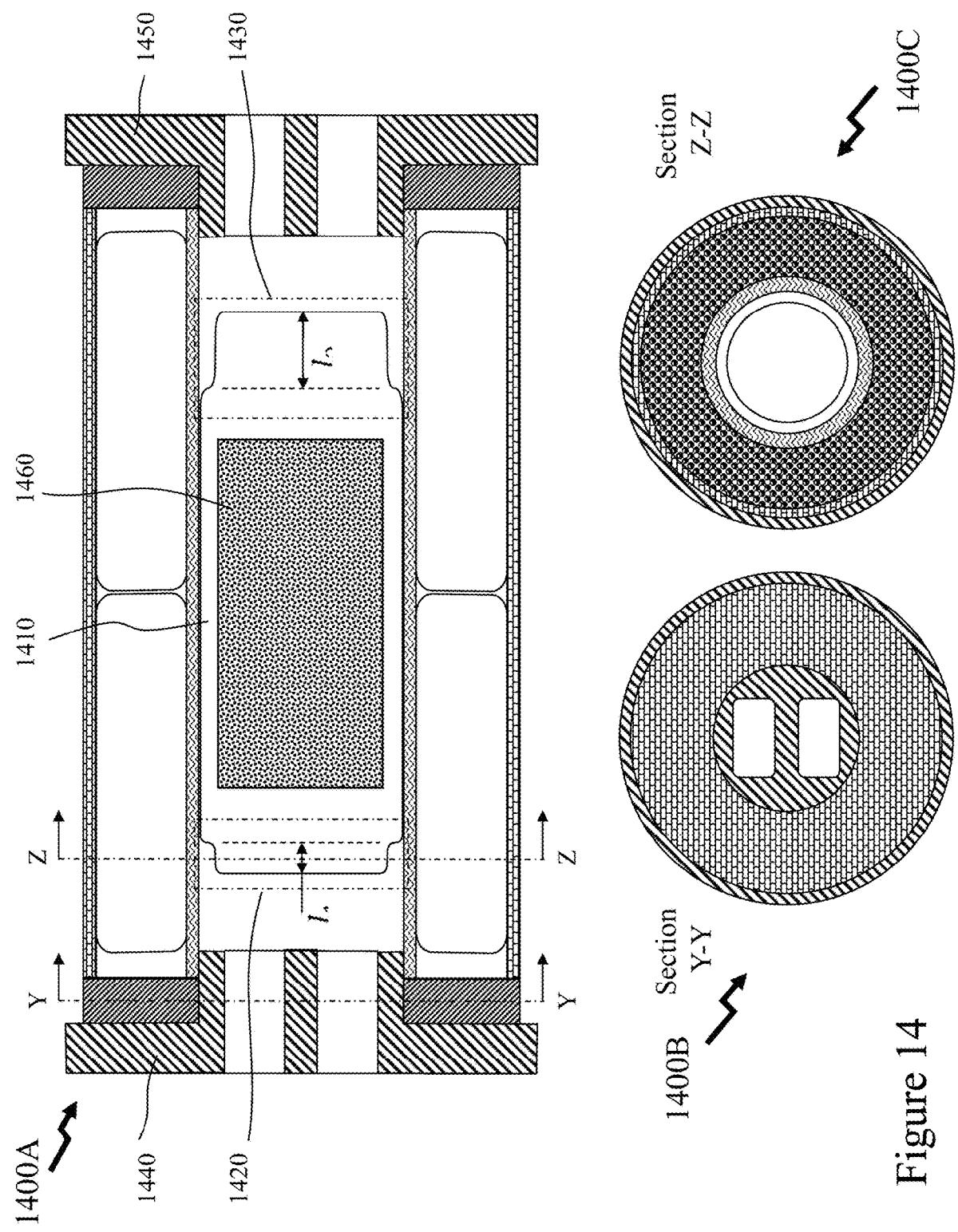
FIG. 14 depicts a cross-sectional view of a LMMC fluidic valve/switch element according to an embodiment of the invention exploiting profiled piston ends.

Now referring to FIG. 14 there is depicted a first cross-section view 1400A of a LMMC fluidic valve/switch element according to an embodiment of the invention exploiting a piston 1410 with left and right profiled piston ends 1420 and 1430 respectively. These engage left and right block valve elements 1440 and 1450 respectively which extend the same distance into the bore of the FVSE. Accordingly, the different "stand-off" distances for the piston are now achieved through the left and right profiled piston ends 1420 and 1430 respectively engaging the left and right block valve elements 1440 and 1450 respectively. As depicted the piston 1410 comprises a molded body around a magnetic core 1460. Also depicted in FIG. 14 are second and third cross-section views 1400B and 1400C respectively along section lines Y-Y and Z-Z respectively which depict the inlet/outlet ports of the block valve 1440 and the end face of the piston 1410.

Figure 15:
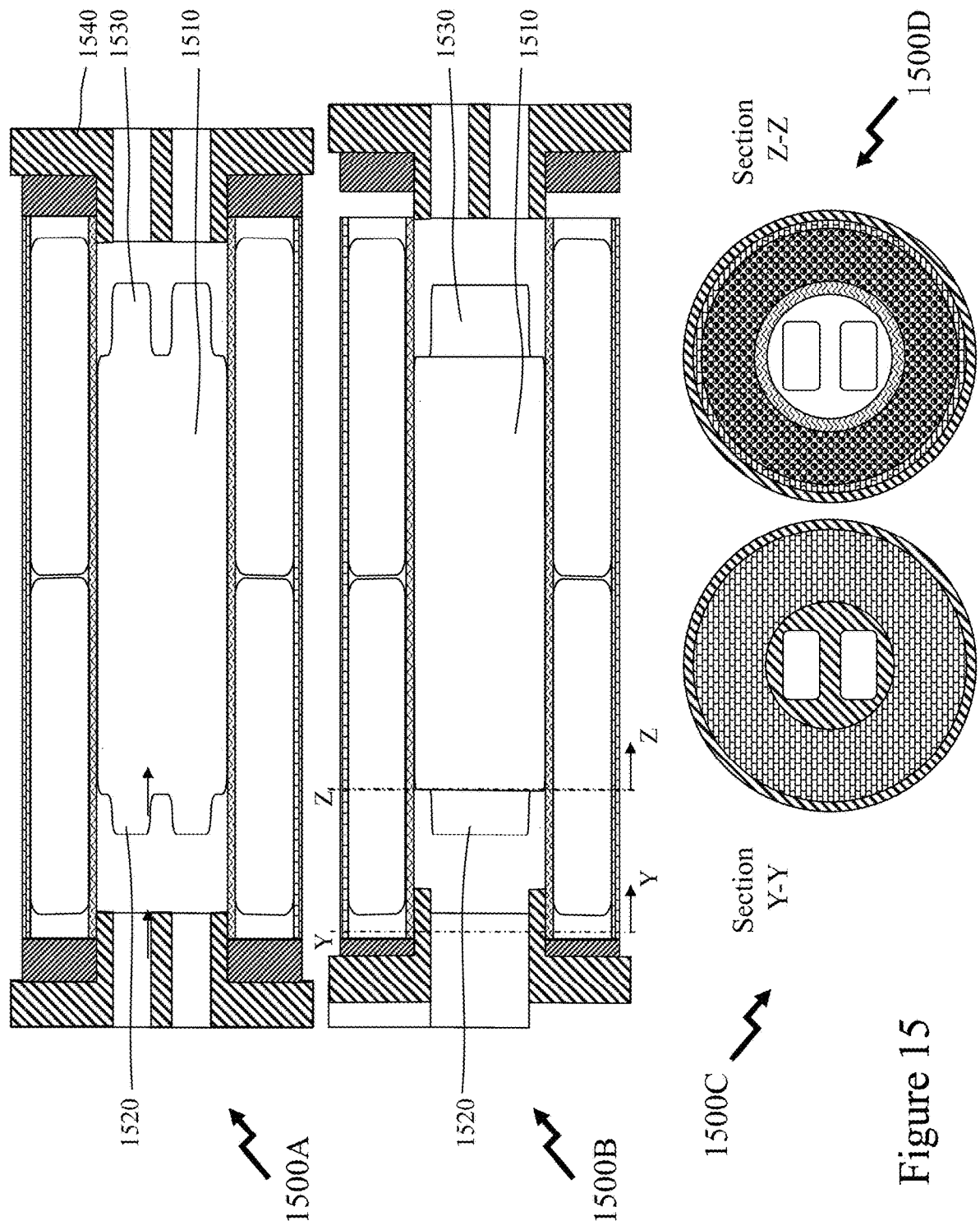
FIG. 15 depicts cross-sectional views of a LMMC fluidic valve/switch element according to an embodiment of the invention exploiting profiled piston ends.

Referring to FIG. 15 there is depicted first and second cross-section views 1500A and 1500B respectively of a LMMC fluidic valve/switch element according to an embodiment of the invention exploiting profiled piston ends. In contrast to FIG. 14 wherein the piston 1410 has a single projection on either end the piston 1510 has a pair of projections 1520 on the left hand end of the piston 1510 and a pair of second projections 1530 on the right hand end of the piston 1510. The piston 1510 may be formed in a similar manner to the piston 1410 in FIG. 14 in that it comprises a body surrounding a magnetic core, e.g. an injection molded plastic surrounding a magnetic core. Also depicted in FIG. 15 are third and fourth cross-section views 1500C and 1500D respectively along section lines Y-Y and Z-Z respectively which depict the inlet/outlet ports of the block valve 1540 and the end face of the piston 1510 with the projections 1520 evident.

Whilst the projections on either of the left side and right side of the piston 1510 are depicted as being of equal length it would be evident that within other embodiments of the invention that one may project further than the other such that one port of the FVSE is blocked slightly earlier than the other as the piston engages that end of the FVSE. For example, the inlet may be blocked ahead of the outlet. Optionally, an end of a FVSE may comprise a pair of inlets and a pair of outlets and have multiple sets of projections such that as the piston moves to that end the inlets and outlets are closed off in a sequence defined by the projections. These projections may be "hard" to engage "soft" openings (ports) within the block valve or vice versa. Each inlet/outlet combination may feed to a different fluidic actuator, for example.

Figure 16:
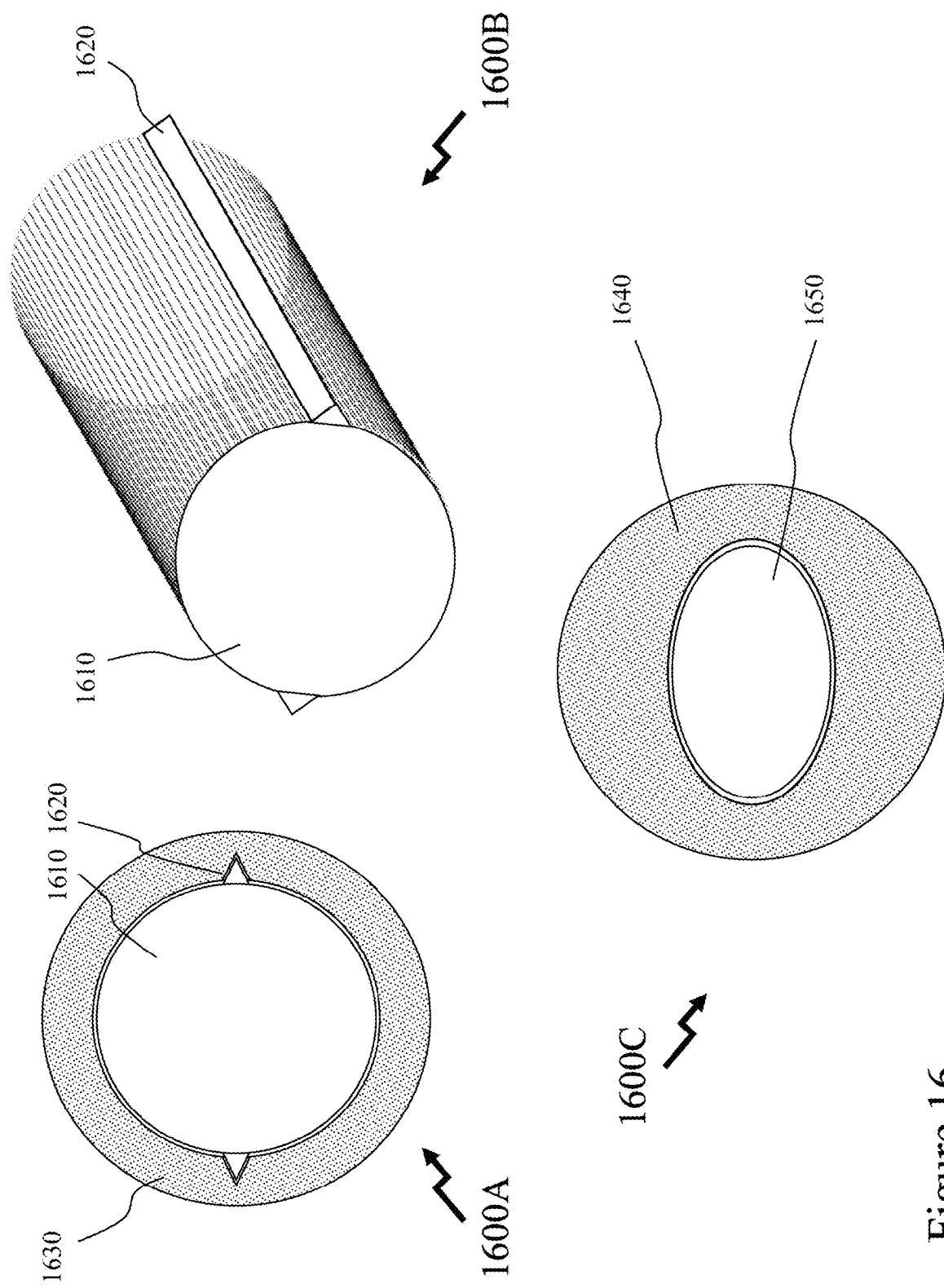
FIG. 16 depicts cross-sectional views of LMMC fluidic valve/switch elements with rotationally restricted pistons.

It would be evident that the piston 1510 in FIG. 15 is orientated with the inlet/outlet ports within the block valve 1540. Accordingly, the piston 1540 if circular as depicted requires orientating to the piston sleeve and block valves to ensure the first and second projections 1520 and 1530 align to the inlet/outlet ports on the block valve 1540. Accordingly, as depicted in FIG. 16 with first and second images 1600A and 1600B respectively the piston 1610 has projections 1620 that engage slots within the piston sleeve 1630 to orientate the piston 1610 within the piston sleeve 1630. Alternatively, as depicted in third image 1600C the piston 1650 may be elliptical within an elliptical bore of the piston sleeve 1640. Optionally, other non-circularly symmetric cross-sections for the piston may be employed.

Figure 17:
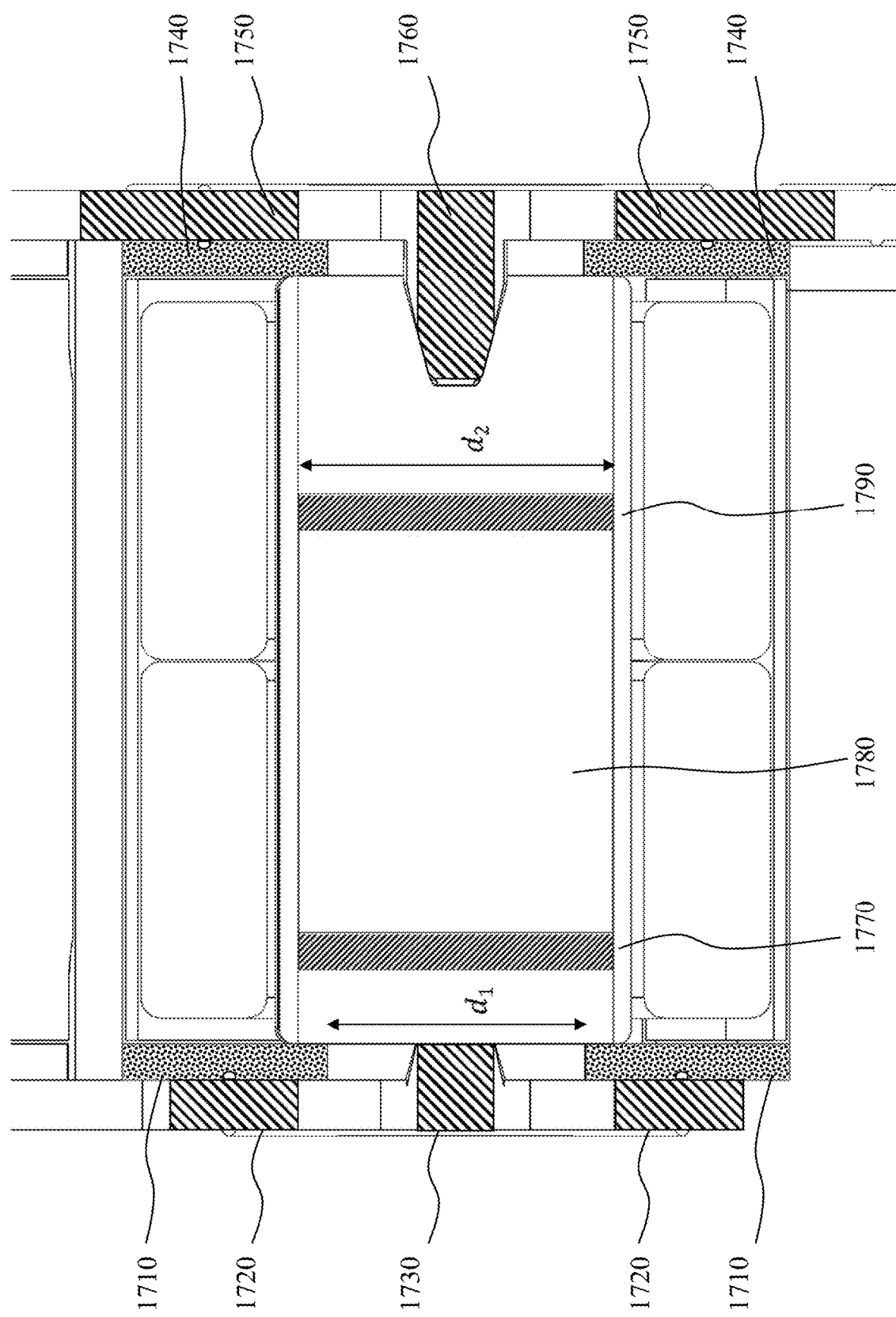
FIG. 17 depicts a cross-sectional view of a LMMC fluidic valve/switch element with increased magnetic retention through reduced diameter magnetic washers in conjunction with gate valve elements according to an embodiment of the invention.

Now referring to FIG. 17 there is depicted a cross-sectional view of a LMMC fluidic valve/switch element with increased magnetic retention according to an embodiment of the invention. The increased magnetic retention being achieved through the use of reduced diameter left and right magnetic washers 1710 and 1740 respectively in conjunction with the left and right gate valve elements 1730 and 1760 respectively within the left and right gate valve elements 1720 and 1750 respectively. The piston 1780 having left and right ends 1770 and 1790 respectively. Accordingly, as one the left hand side the piston 1780 position to the extreme is defined by the left end 1770 of the piston 1780 engaging the left gate valve element 1730 and left magnetic washer 1720 the left end 1770 may be "soft" rather than "hard" and hence formed from an elastomer or rubber, for example.

Figure 18:
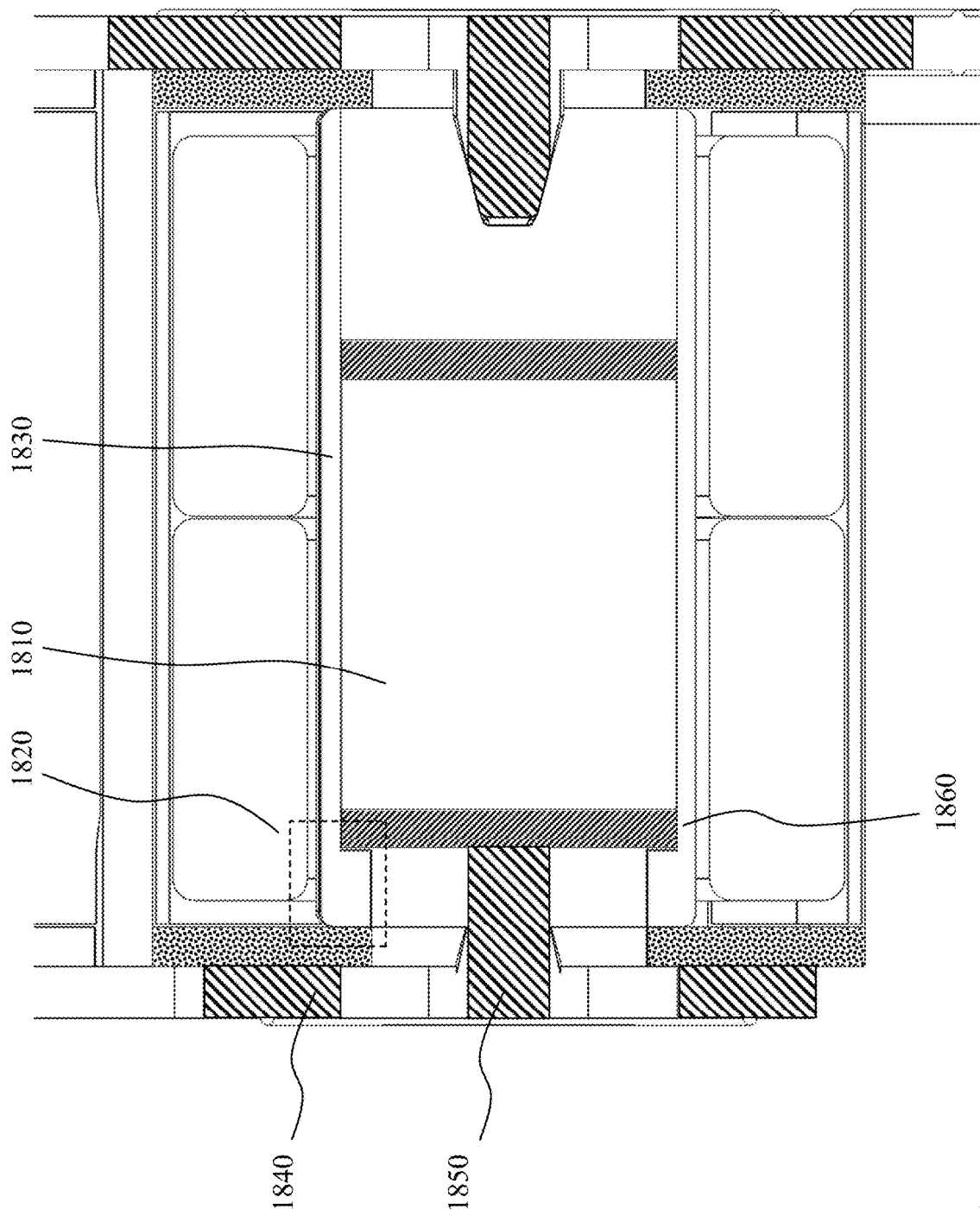
FIG. 18 depicts a cross-sectional view of a LMMC fluidic valve/switch element with increased magnetic retention through reduced diameter magnetic washers in conjunction with gate valve elements according to an embodiment of the invention.

Now referring to FIG. 18 there is depicted a cross-sectional view of a LMMC fluidic valve/switch element with increased magnetic retention according to an embodiment of the invention. In contrast to the designs described and depicted in FIGS. 2 to 17 the left end motion of the piston 1810 is now stopped by a reduction in diameter of the piston sleeve 1830 at the end region 1820. The gate valve stop 1850 of the gate valve 1840 is similarly "soft" and projects either to the same depth as the diameter reduction within the piston sleeve 1830 or slightly further such that the piston end 1860 compresses it and stops against the end of the piston sleeve 1830. Optionally, rather than a diameter reduction at the end of the piston sleeve 1830 the "stop" is achieved through a projecting ring, projection or series of projections.

Now referring to FIG. 19 there are depicted in first to fourth views 1900A to 1900D of an FVSE according to an embodiment of the invention with a different construction methodology wherein the valve elements are disposed inside the magnetic washers rather than through them from the outside of them. First and second images 1900A and 1900B depict two mutually perpendicular cross-sectional assembly perspective views of the FVSE. Within these a piston 1960 within a piston tube 1950 is clearly visible together with a pair of annular coils 1930 and an inner magnetic washer 1940. It is also evident that the piston 1960 when at either end of the LMMC 100 contacts a non-magnetic washer 1920 and not an outer magnetic washer 1910. Accordingly, where the non-magnetic washer 1920 is a block valve washer then the thickness of the non-magnetic washer(s) 1920 allows the magnetic retention force between the piston 1960 and the first magnetic washer 1910 to be adjusted when no power is applied to either of the annular coils 1930. Alternatively, if the non-magnetic washer 1920 is a gate valve washer then the height of the projecting gate valve element from the body of non-magnetic washer into the FVSE bore adjusts the stop position of the piston 1960.

It is also evident that fluid from an inlet which is coupled through aligned first openings within the magnetic washer 1910 and non-magnetic washer 1920 can be coupled to an outlet formed by the aligned second openings of the magnetic washer 1910 and non-magnetic washer 1920 via the region of the piston tube 1950 between the magnetic washer 1910 and non-magnetic washer 1920 and the end of the piston 1960 when the piston 1960 is moved away from the non-magnetic washer 1920. When the piston 1960 moves to one end of the piston tube 1950 then its closes the connection between an inlet and outlet at one end of the LMMC 100 and opens the connection at the other end. When the piston 1960 moves to the other end then the closed connection is opened, and the open connection closed.

Figure 19A:
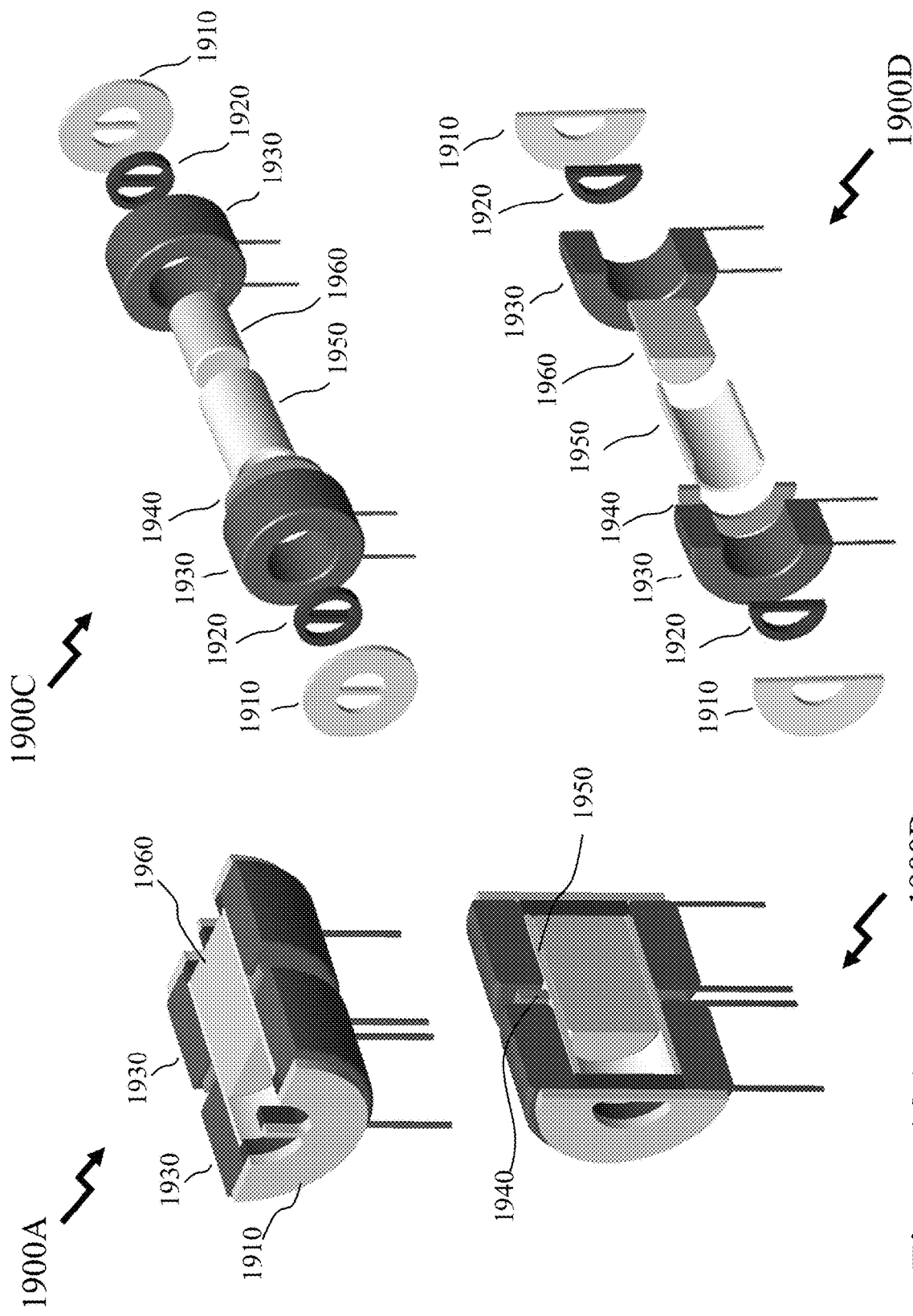
FIG. 19A depicts cross-sectional assembly, exploded assembly and exploded cross-section exploded assembly perspective views of a LMMC fluidic valve/switch element according to an embodiment of the invention.

Referring to third and fourth images 1900C and 1900D of FIG. 19A there are depicted exploded assembly perspective and cross-sectional exploded assembly perspective views of the FVSE according to an embodiment of the invention. Accordingly, at either end there are first magnetic washers 1910 wherein each has a pair of openings separated by central element which is intended to align with a mating external assembly having first and second fluidic channels aligning to the pair of openings and separated by a central "wall" that aligns to the central element. Each outer magnetic washer 1910 abuts an annular coil 1930. Disposed within the outermost end of each annular coil 1930 is a non-magnetic washer 1920 which has a pair of openings and central element aligned to those within the outer magnetic washers 1910. Between the non-magnetic washers 1920 is piston tube 1950 within which the piston 1960 moves wherein the outer diameter of the piston tube 1950 is dimensioned to fit within the annular coils 1930. Disposed around the piston tube 1950 between the annular coils 1930 is inner magnetic washer 1940. Optionally, inner magnetic washer 1940 may be omitted from other embodiments of the invention.

In operation the piston is driven to one end or the other of the LMMC 100 under action of one or other or both annular coils 1930 which when electrically energized create a magnetic field acting upon the piston 1960. However, once driven to one end of the other the annular coil(s) 1930 may be de-energized as the magnetic attraction between the first washer magnet 1910 and the piston 1960 maintains the piston in position against the non-magnetic washer 1920. The magnetic force may be adjusted lower/higher by increasing/decreasing the thickness of the non-magnetic washer 1920.

Figure 19B:
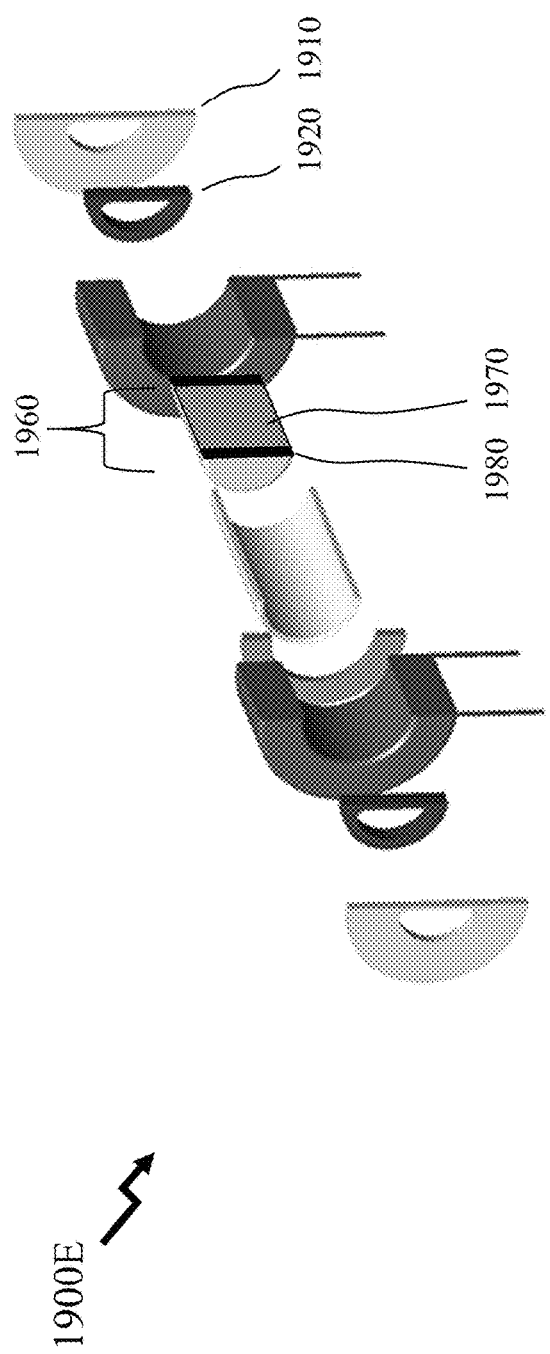
FIG. 19B depicts a cross-sectional exploded assembly perspective view of a LMMC fluidic valve/switch element exploiting a piston with end caps which engage the non-magnetic washers.

As discussed above in respect of FIGS. 12A, 12B, and 13 the non-magnetic washers may be "soft" or "hard" and engage with piston ends that are respectively "hard" and "soft." Accordingly, within first image 1900E in FIG. 19B the piston 1960 is depicted as core 1970 with piston ends 1980. Accordingly, within an embodiment of the invention the piston ends 1980 may be "hard" and the non-magnetic washers 1920 "soft" whilst within another embodiment of the invention the piston ends 1980 may be "soft" and the non-magnetic washers 1920 "hard." Alternatively, within another embodiment of the invention the piston ends 1980 may be "hard", the non-magnetic washers 1920 "hard" but with "soft" gate valve elements or "soft" ends of block valve elements disposed towards the piston 1960.

Within other embodiments of the invention one piston end may be "hard" and the other "soft."

Within other embodiments of the invention where the LMMC fluidic element is employed as an oscillatory element such as a pump or vibratory actuator the fluidic block or gate valve elements may be "soft" as are the ends of the piston such that the piston when driven towards the valve element "impacts" and bounces back before a reverse electromagnetic field drives the piston towards the other end and it again bounces. In this manner the LMMC element oscillates but as the deceleration, stop and reverse motion of the piston at the end are derived through the soft elements the electromagnetic drive is only required during part of the cycle to move the piston partway along each reversal.

Within embodiments of the invention a block valve has been depicted as comprising an outer portion against the external surface of the magnetic washer and an inner portion comprising an outer ring with a central divider to form that portion of the pair of openings through the portion of the non-magnetic washer that projects through the magnetic washer into the bore of the FVSE and abuts the piston end. In contrast, a gate valve has been depicted as comprising an outer portion against the external surface of the magnetic washer and an inner portion comprising a central element that forms the pair of openings in conjunction with the piston sleeve within which the piston moves. However, it would be evident that a hybrid valve design may exploit a design similar to a block valve in that there is an outer ring and a central divider but the central divider projects further through the magnetic washer into the bore of the FVSE than the outer ring and abuts the piston end either solely or initially before the piston abuts both the outer ring and central divider.

Within the embodiments of the invention described above in respect of FIGS. 1 to 19B the standoff has been primarily described as being different on one side of an FVSE and/or FVSAM to the other, e.g. the magnetic force required for holding a FVSE closed against a fluid source at zero pounds per square inch (0 psi) PSI source) is less than that required for a fluid source at, say, seven pounds per square inch (7 psi) and accordingly the separation between the magnetic piston and the magnetic washer can be larger for a FVSE operating on the 0 psi source than for one operating on the 7 psi source. Accordingly, the smaller the standoff distance from the magnet face to the inside face of the magnetic washer the larger the latching force and the more energy it takes to move the magnetic piston away from its latched position (all other aspects such a pressure difference etc. being equal).

Alternatively, the distances between the magnet face of the piston and the inner face of the magnetic washer may be the same but the dimensions of the magnetic washer may be adjusted to adjust the latching force for the same strength magnetic material. Alternatively, the magnetic material may be different at each end of the FVSE.

For example, rather than a 0.030" (0.762 mm) thickness washer being employed on both ends of the FVSE a reduction in latching force can be achieved by reducing the magnetic washer thickness to 0.010" (0.254 mm) or below.

Alternatively, the smaller the internal diameter of the magnetic washer the stronger the latching force although as this diameter reduces. However, as the internal diameter of the magnetic washer is reduced to less than that of the magnetic element of the piston then the smaller the openings to provide the inlet and outlet ports of the FVSE are as typically the outer diameter of the piston defines the inner diameter of piston sleeve. Similarly, as the inner diameter of the magnetic washer is increased beyond that of the magnetic element forming the piston then the latching force reduces. However, whilst increasing/decreasing the inner diameter of the magnetic washer adjusts the latching force it also adjusts the electrical drive efficiency of the electromagnetic coils in the same direction and hence whilst a reduction in latching force can be achieved then a corresponding reduction in the electrical efficiency of the FVSE in switching between states is observed.

Accordingly, a configuration with high latching force can be employed at either end of the FVSE and if required the latching force reduced by making the magnet relatively weak, either by selecting a different magnetic material for example or employing less magnetic material within a cast, molded, or stamped magnetic washer employing magnetic material within a body of one or more other materials. For example, using neodymium magnets may be formed at N26, N27, or N28 for reduced magnetic strength.

Within the embodiments of the invention described in respect of FIGS. 1 to 19B magnetic washers are only employed at the ends of the piston sleeve and hence ends of the FVSE. However, within other embodiments of the invention a central washer is disposed between axially along the piston sleeve between the pair of electromagnetic coils. This central washer being formed, for example, from iron.

Within embodiments of the invention described in respect of FIGS. 1 to 19B FVSEs have a switching speed typically in the range of 10 milliseconds (10 ms) or less depending upon the size of the FVSE, power, length of the piston travel, fluid viscosity etc. Accordingly, a typical "ON" and "OFF" cycle of a FVSE being driven from one end to the another and back (i.e. a FVSE with openings on either end so one end sees "ON" then "OFF" whilst the other end sees "OFF" and "ON") would be typically under 30 milliseconds (30 ms). This switching cycle can accordingly achieve pulsed fluid actuations in the range of 30 Hz or higher. It would be evident that whilst there is not a significant fluid flow at these higher switching speeds the FVSE switching creates pressure and flow pulses at the control frequency and this pulsed pressure/flow can be employed to impart vibration to another portion of the fluidic system to which the FVSE is coupled such that the pressure/flow pulses act as a stimulation or vibration source for massagers, vibrators, etc.

Within the embodiments of the invention described in respect of FIGS. 1 to 19B FVSEs have been described as comprising an outer shell. This may within some embodiments of the invention be formed from iron in order to provide magnetic shielding of an FVSE from external magnetic fields such as arising from other FVSEs within a FVSAM, for example. Alternatively, the outer shell may be formed from a suitable material such as a plastic to form protection/housing for the FVSE. Optionally, the electromagnetic coils etc. may be potted with a silicone or other suitable material wherein the outer shell provides a "holder" for the potting process and which is filled with the potting material. Optionally, the outer casing can overlap the washer such that the outer diameter of the washer is less than the inner diameter of the outer casing. Alternatively, the outer diameter of the outer sleeve may be the same as or less than the magnetic washers on either end so that the outer casing is capped by the magnetic washers.

Figure 20A:
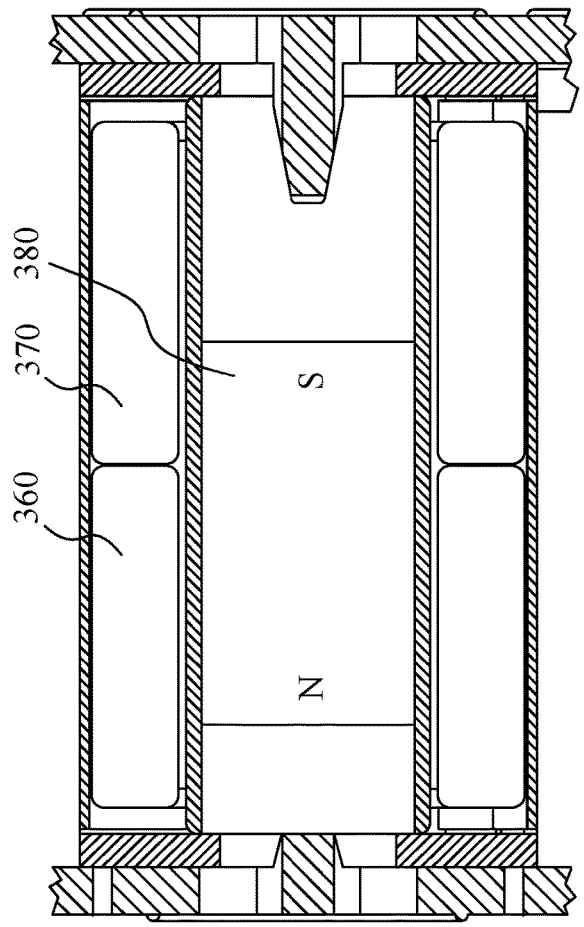
FIGS. 20A and 20B depict LMMC fluidic valve/switch elements exploiting a pair of coils with single magnetic piston element and a single coil with dual magnetic piston elements respectively.
Figure 20B:
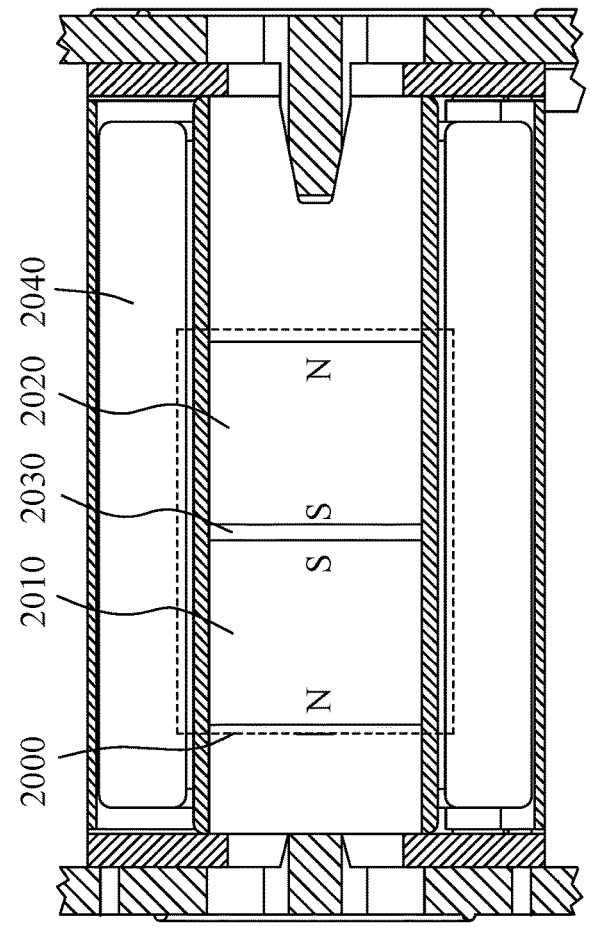

Within the embodiments of the invention described in respect of FIGS. 1 to 11 and 12 to 19B FVSEs have been described as employing a pair of coils in conjunction with a piston comprising a single axial magnetic element as depicted in FIG. 20A wherein first and second coils 360 and 370 are depicted with piston 380 in common with FIG. 3. However, within other embodiments of the invention the piston may be formed from a pair of shorter axial magnetic elements joined together with similar poles facing one another, e.g. north to north or south to south, with a thin layer of plastic or iron disposed between them yielding a piston therefore with a pair of externally facing south poles or north poles such that a single coil may be employed to drive the FVSE. Such a configuration being depicted in FIG. 20B wherein a single coil 2040 is depicted around a piston 2000 comprising first magnet 2010 and second magnet 2020 disposed with side of a spacer 2030. As depicted the first magnet 2010 has a north (N) pole on the left hand side (LHS) and south (S) pole on the right hand side (RHS) whilst the second magnet 2020 has a south (S) pole on the LHS and a north (N) pole on the RHS. Alternatively, the first magnet 2010 has a south (S) pole on the left hand side (LHS) and north (N) pole on the right hand side (RHS) whilst the second magnet 2020 has a north (N) pole on the LHS and a south (S) pole on the RHS.

Figure 21A:
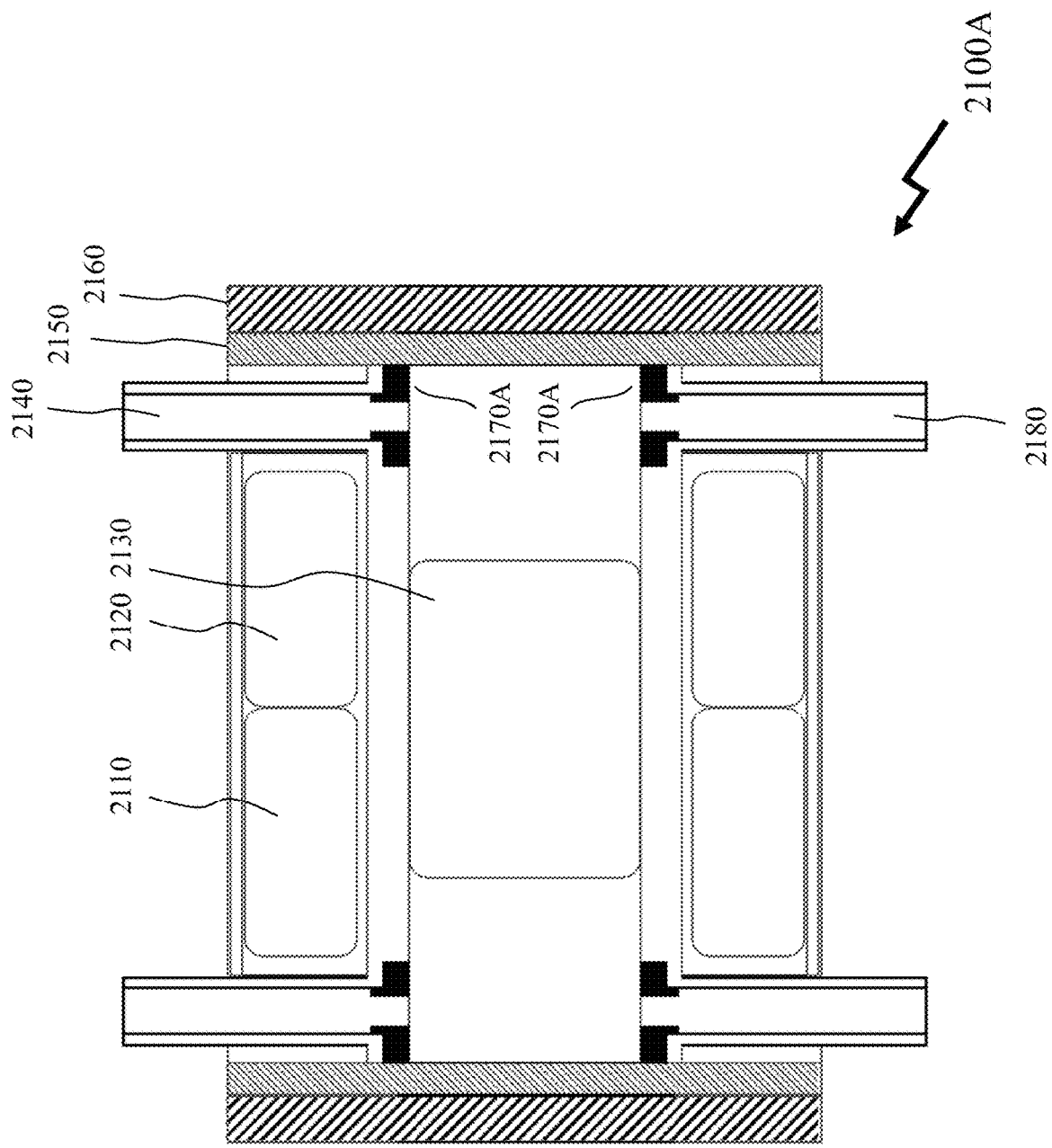
FIGS. 21A and 21B depict LMMC fluidic valve/switch elements exploiting piston engaging gaskets wherein the gaskets engage against the side of the pistons rather than their endface(s).

It would also be evident that within other embodiments of the invention the underlying concept of a gasket engaging against the piston to seal the inlet/outlet ports of a FVSE as described and depicted in respect of FIGS. 1 to 20B may be exploited with the valve inlet/outlet ports being blocked/opened by the side of the piston as it moves within the piston sleeve. Two examples of such configurations are depicted within FIGS. 21A and 21B respectively. Within FIG. 21A an FVSE 2100A according to an embodiment of the invention is depicted comprising first and second coils 2110 and 2120 respectively together with a piston 2130. Disposed at either end of the FVSE 2100A on the sides of the FVSE 2100A are ports 2140 which have gasket elements 2170A on the inner surface of the FVSE 2100A to engage against the sides of the piston 2130 as it moves from one end of the FVSE 2100A to the other thereby blocking fluid flow from an inlet port 2140 to an outlet port 2180 or allowing fluid flow from an inlet port 2140 to an outlet port 2180. As with the embodiments of the invention described supra the gasket elements 2170A may be "hard" and engage a "soft" end of the piston 2130 (which is not depicted as comprising a magnetic core with soft ends for clarity) or they may be "soft" and engage "hard" ends of the piston 2130 (essentially the configuration depicted in FIG. 21A with FVSE 2100A). Disposed at each end of the FVSE are a non-magnetic spacer 2150 and magnetic washer 2160 wherein the thickness of the non-magnetic spacer 2150 may provide for the adjustment in stand-off distance between the magnetic washer 2160 and piston 2130 to adjust the latching force.

Figure 21B:
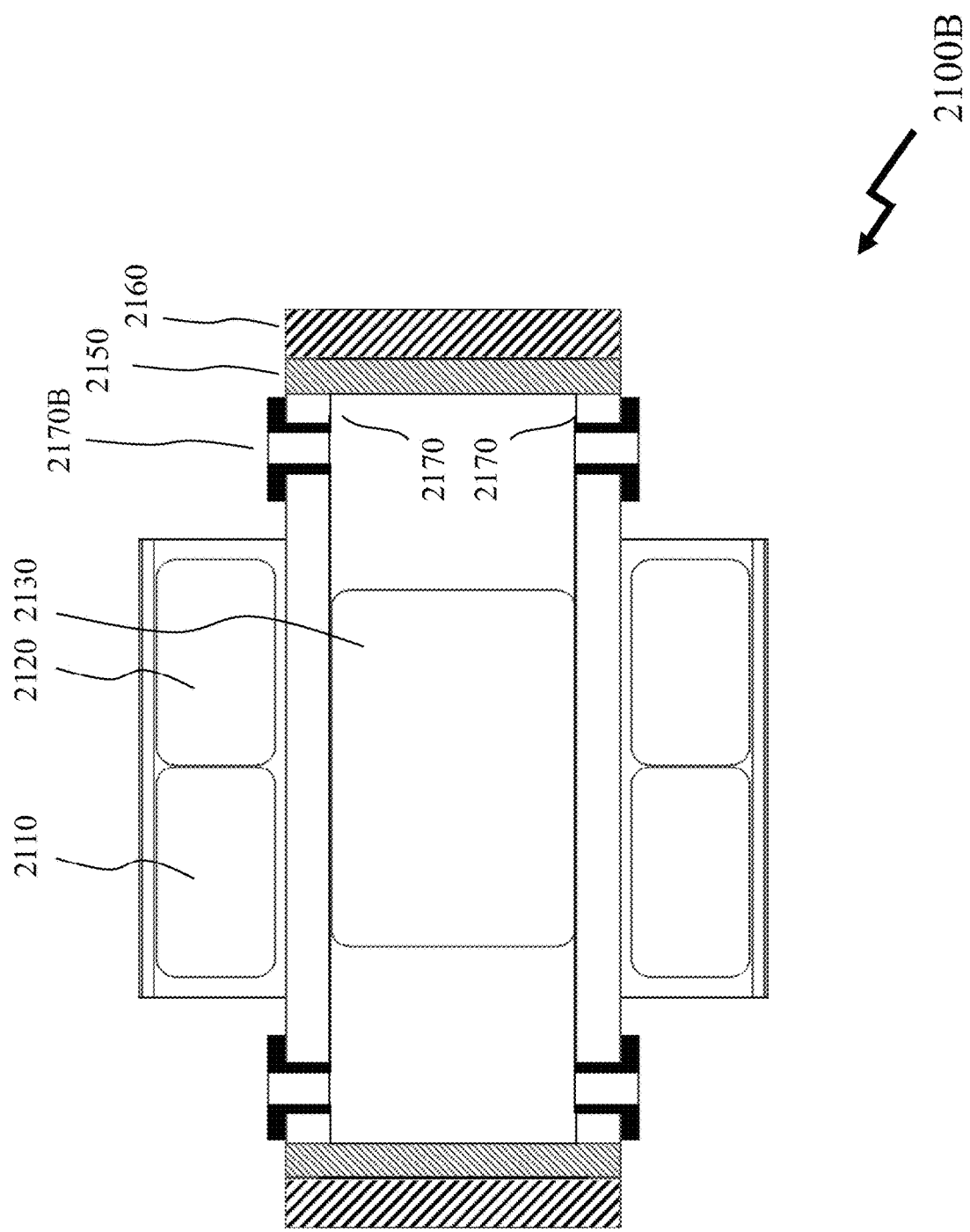

Referring to FIG. 21B there is depicted an FVSE 2100B according to an embodiment of the invention comprising first and second coils 2110 and 2120 respectively together with the piston 2130, non-magnetic spacer 2150 and magnetic washer 2160. In this embodiment the gasket elements 2170B project in from the exterior of the FVSE 2100B. The addition inlet and outlet tubing depicted in FIG. 21A as inlet port 2140 and outlet port 2180 with FVSE 2100A are not depicted for clarity. As with FVSE 2100A in FIG. 21A the gasket elements 2170B may be "hard" and engage a "soft" end of the piston 2130 (which is not depicted as comprising a magnetic core with soft ends for clarity) or they may be "soft" and engage "hard" ends of the piston 2130 (essentially the configuration depicted in FIG. 21B with FVSE 2100B).

As embodiments of the invention for an FVSAM may exploit two or more FVSEs then it would be evident that these may be disposed within a linear one-dimensional (1D) or two-dimensional (2D) array comprising an array of bores within an outer body with a linear sheet of gasket material disposed along to provide the gasket elements 2170A or 2170B at each FVSE 2100A or 2100B within the array. With an FVSAM comprising FVSEs 2100A the linear sheet of gasket material is inserted within the FVSAM prior to the non-magnetic spacers 2150 and magnetic washers 2160 being attached. These, it would be evident therefore, may be sheets applied across all FVSEs within the 1D or 2D array. However, with an FVSAM assembled exploiting FVSEs 2100B it would be evident that the sheet of gasket material may be applied after assembly of the FVSEs within the FVSAM and then the assembled array of FVSEs may have assemblies applied either to each end or above and below to provide the fluidic inlet ports and outlet ports that couple to the remainder of the fluidic circuit that employs the FVSEs.

Within embodiments of the invention an outer sleeve, formed from a magnetic material, such as outer sleeve 395 in FIGS. 3 and 4 respectively or outer sleeve 795 in FIGS. 7 and 8 respectively may be omitted. In such embodiments the magnetic field from the coils extends further such that the FVSEs may experience crosstalk from other FVSEs within an FVSAM or from other sources of magnetic fields in the vicinity of the device comprising the FVSE(s).

Optionally, the magnetic elements, such as the magnet washer(s), piston or a magnetic core of a piston, may be an axial magnetized magnet formed from a powdered magnetic material embedded within one or more other materials which is then magnetized into what the inventor calls an axial magnetized magnet. The one or other materials provide the physical support for the magnetic material, e.g. ferromagnetic iron powder, and its shape etc. Such materials may include resins, thermoplastics, plastics, epoxies, low temperature glasses etc. Within another embodiment of the invention the piston may be formed from a laminated structure such that an alternating structure formed from layers of magnetic (or magnetizable) material are laminated with an electrically isolating material allowing Eddy currents within the piston to be suppressed. For example, thin magnetic discs may be stacked with thin plastic discs and potted/encapsulated within a casing or glued together/fused together. Optionally, the stacked structure may alternate along the length of the piston or it may be layer across the width of the piston. If non-uniform piston geometries are required, then these can be implemented during manufacturing through varying geometry piece-parts or through machining an assembled stack of materials or a combination of both. A powder based magnetic material may be embedded into a layer, followed by a layer without the material, followed by another layer with the magnetic material. The thickness of electrically isolating layers may be less than, equal to, or thicker than the layers with magnetic materials.

Optionally, the design of a piston may include magnetic materials, e.g. iron, to form caps at either end of an axially magnetised piston body or a laminated piston body or other piston in order to improve the magnetic flux density or "focus" the magnetic flux within the piston relative to the magnetic field within the coil without the piston.

It would be evident to one skilled in the art that the depictions of ECPUMPs and LMMCs in respect to embodiments of the invention within the descriptions and drawings have not shown or described the construction or interior configuration of the excitation coil or annular coil. The design and winding of such coils is known within the art and their omission has been for clarity of depiction of the remaining elements of the ECPUMPs and/or LMMCs. For example, the coil may be wound or formed upon a bobbin core and housed within bobbin case which includes an opening(s) for feeding the electrical wires in/out for connection to the external electrical drive and control circuit. Such coils may be wrapped and/or potted to encapsulate them. Examples of such coils include, for example, 170/22, 209/23, 216/24, 320/24, 352/24, 192/28 (e.g. 8 layers of 24 turns per layer), 234/28, 468/32, and 574/33. Each pair of numbers representing the number of windings and American wire gauge (AWG) of the wire employed. It would be evident that other designs may be employed without departing from the scope of the invention.

The foregoing disclosure of the embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A fluidic device comprising:
   a piston comprising at least a core formed from a first magnetic material having a first length and a first predetermined lateral dimension;
   a piston sleeve formed from a first predetermined non-magnetic material having an inner bore having a predetermined tolerance with respect to the first predetermined lateral dimension of the piston, an outer profile of a second predetermined lateral dimension, and a second length;
   at least an electrical coil of a plurality of electrical coils, each electrical coil with an inner bore having a predetermined tolerance with respect to the second predetermined lateral dimension, a fourth length, and disposed at a predetermined position relative to the piston sleeve in dependence upon at least the lengths of the piston sleeve and piston;
   a pair of magnetic washers formed from a second predetermined magnetic material each having a second thickness and having a central opening, wherein each magnetic washer is disposed at one end of the piston sleeve; and
   a pair of non-magnetic valve elements formed from at least a third predetermined non-magnetic material comprising a pair of open-ended fluid passages projecting through the magnetic washer towards the middle of the piston sleeve;
   wherein
   in a first configuration the piston is retained against the open ends of the open-ended fluid passages of one of the pair of non-magnetic valve elements at one end of the piston sleeve by magnetic attraction to the magnetic washer at that end of the piston sleeve thereby blocking fluid flow through the pair of open-ended fluid passages at that end of the piston sleeve but allowing fluid flow through the pair of open-ended fluid passages at the other distal end of the piston sleeve;
   in a second configuration the piston is retained against the open ends of the open-ended fluid passages of the other one of the pair of non-magnetic valve elements at the other distal end of the piston sleeve by magnetic attraction to the magnetic washer at that distal end of the piston sleeve thereby blocking fluid flow through the pair of open-end fluid passage at that distal end of the piston sleeve but allowing fluid flow through the pair of openings via at the other end of the piston sleeve; and
   the piston is moved to establish either of the first configuration and the second configuration by selective electrical excitation of the at least one electrical coil of the plurality of electrical coils.

2. The fluidic device according to claim 1, wherein
   the retention force between a magnetic washer and the piston in either of the first and second configurations is determined in dependence upon a distance that the open-ended fluid passages projects through the magnetic washer towards the middle of the piston sleeve.

3. The fluidic device according to claim 1, wherein
   the inner portion comprises an outer ring and a central divider thereby providing that portion of the pair of openings through the inner portion;
   the remainder of the pair of openings are through the outer portion; and
   the piston engages at least the central divider of the inner portion.

4. The fluidic device according to claim 3, wherein either:
   the outer ring and central divider both project the same distance into the bore of the fluidic device; or
   the central divider projects further into the bore of the fluidic device than the outer ring.

5. The fluidic device according to claim 1, wherein
the inner portion comprises a central divider thereby dividing the bore of the piston sleeve into two regions which are each fluidically coupled to one opening of the pair of openings;
the pair of openings are through the outer portion; and
the piston engages the central divider of the inner portion.

6. The fluidic device according to claim 1, wherein
the core forms the entire piston;
the first magnetic material has a first elastic modulus;
the third predetermined non-magnetic material has a second elastic modulus lower than the first elastic modulus.

7. The fluidic device according to claim 1, wherein
the piston comprises a pair of end caps at either end of the piston with the core between them;
the pair of end caps are formed from a material having a first elastic modulus;
the third predetermined non-magnetic material has a second elastic modulus either lower than or higher than the first elastic modulus.

8. The fluidic device according to claim 1, wherein
the core forms the entire piston;
the first magnetic material has a first elastic modulus;
each non-magnetic washer comprises the outer portion and a first predetermined portion of the inner portion formed from the predetermined non-magnetic material;
the remainder of the inner portion of each non-magnetic washer forms the surface against which the piston abuts and is formed from another predetermined non-magnetic material having a second elastic modulus lower than the first elastic modulus.

9. The fluidic device according to claim 1, wherein
the piston comprises a pair of end caps at either end of the piston with the core between them;
the pair of end caps are formed from a material having a first elastic modulus;
each non-magnetic washer comprises the outer portion and a first predetermined portion of the inner portion formed from the predetermined non-magnetic material;
the remainder of the inner portion of each non-magnetic washer forms the surface against which the piston abuts and is formed from another predetermined non-magnetic material having a second elastic modulus either lower than or higher than the first elastic modulus.

10. The fluidic device according to claim 1, wherein
the piston further comprises N projections along its outer surface along its length;
the piston sleeve further comprises N grooves along its inner surface along its length; and
the piston is inserted into the piston sleeve such that N projections are engaged within the N grooves thereby restricting rotation of the piston within the piston sleeve and defining an orientation of the piston to the piston sleeve.

11. The fluidic device according to claim 10, wherein
either an end of the piston comprises or both ends of the piston comprise a pair of projections which are aligned with the pair of openings; and
the pair of projections engage and disengage with the pair of openings when the piston is driven into contact with and out of contact with the non-magnetic washer.

* * * * *